United States Patent [19]
Kamimura

[11] Patent Number: 5,343,703
[45] Date of Patent: Sep. 6, 1994

[54] CONTROL APPARATUS OF CONTROL SURFACE OF AIRCRAFT

[75] Inventor: Toshio Kamimura, Gifu, Japan

[73] Assignee: Teijin Seiko Co., Ltd., Osaka, Japan

[21] Appl. No.: 145,604

[22] Filed: Nov. 4, 1993

[30] Foreign Application Priority Data

Nov. 12, 1992 [JP] Japan .................................. 4-302222

[51] Int. Cl.$^5$ .............................................. F16D 31/02
[52] U.S. Cl. ........................................ 60/403; 60/459; 91/461
[58] Field of Search ................. 60/399, 420, 403, 445, 60/452, 459, 460, 466; 91/420, 421, 461, 517

[56] References Cited

U.S. PATENT DOCUMENTS

| | | | |
|---|---|---|---|
| 3,398,531 | 8/1968 | Swanson et al. | 60/466 |
| 4,143,583 | 3/1979 | Bauer et al. | 60/403 X |
| 4,647,004 | 3/1987 | Bihlmaier | 60/403 X |
| 5,074,495 | 12/1991 | Raymond | 60/403 X |
| 5,100,082 | 3/1992 | Archune | 60/403 X |
| 5,146,745 | 9/1992 | Doetsch | 60/403 |
| 5,191,826 | 3/1993 | Brunner | 60/466 X |

Primary Examiner—Edward K. Look
Assistant Examiner—Hoang Nguyen
Attorney, Agent, or Firm—Lane, Aitken & McCann

[57] ABSTRACT

A control apparatus comprises a plurality of servomechanisms for controlling a control surface of an aircraft. Each of the servomechanisms is equipped with a control valve for controlling the oil pressure in hydraulic chambers of the actuator assembly operatively connected to the control surface, and a switching valve provided between the actuator assembly and the control valve and shiftable to assume driving, bypassing and damper valve positions. The switching valves of the servomechanisms are shifted to assume the driving valve position in a normal operation. If one of the servomechanisms is damaged, the switching valve of the damaged servomechanism is shifted to assume the bypassing valve position. If all of the servomechanisms are damaged, the switching valves of the damaged all servomechanisms are shifted to assume the damper valve position.

14 Claims, 9 Drawing Sheets

CONTROL APPARATUS OF CONTROL SURFACE OF AIRCRAFT

FIELD OF THE INVENTION

The present invention relates in general to a control apparatus of control surfaces such as ailerons, elevators and rudders of aircraft, and in particular to such surfaces which are actuated by parallel-redundant servomechanism.

DESCRIPTION OF THE PRIOR ART

Recently, there have usually been adopted maneuvering systems comprising hydraulic, mechanical and electrical systems which are liable to be out-of-ordered or otherwise damaged and which are thus multiplexed to carry out so called a fly-by-wire method for aircraft to reduce rate of faults, thereby obtaining maximum functional reliability in the control of control surfaces such as ailerons and the like of the aircraft. The example shown in FIG. 7 is representative for typical conventional hydraulic servomechanisms which are multiplexed and each comprises first and second servomechanisms generally designated by the reference numerals 9 and 9', respectively. In FIG. 7, a control surface or aileron 1 is connected with actuators 2 and 2' which are arranged in parallel and compatible relationship to each other. The actuators 2 and 2' are operatively connected with control circuits 4 and 4', respectively, which are, in turn, connected to a pilot stick or a flight computer 3. In accordance with the commands of the pilot stick or flight computer 3, the control circuits 4 and 4' and the actuators 2 and 2' are operated to control the control surface 1 by means of a hydraulic working oil from hydraulic working oil sources 5 an 5'. In the case that either one of these hydraulic servomechanisms 9 and 9', for example, the first hydraulic servomechanism 9 happens to be damaged or otherwise do not work properly, the actuator 2 of the damaged servomechanism 9 interferes with the operation of the actuator 2' of the normally operated servomechanism 9 so that the control surface 1 normally operated by the actuator 2' cannot be operated. For this reason, fault-detecting control circuits 6 and 6', which are entirely independent with respect to one another, are provided in the first and second servomechanisms 9 and 9', respectively, to detect whether the actuators 2, 2' of the mechanisms 9, 9' are damaged and thereby to prevent the normal actuators from interfering with the abnormal actuators.

A generally known control apparatus for controlling a control surface of an aircraft are provided with multiplexed servomechanisms only one which is shown in FIG. 8. The servomechanisms each includes a double-acting actuator 10 having a piston 13 which is slidably received in a cylinder 11 and which is operatively connected through a rod 12 to a control surface or aileron 1 (not shown). The cylinder 11 of the double-acting actuator 10 is divided into a pair of cylinder chambers 11a and 11b by the piston 13. The cylinder chambers 11a and 11b are supplied with hydraulic working oil of a hydraulic working oil source 14 through a switching valve 15, a servo valve 16 and a bypass valve 17, which are disposed in the recited order between the hydraulic working oil source 14 and the actuator 10. The alternative admission and discharge of the hydraulic oil to and from the chambers 11a and 11b of the cylinder 11 causes the piston 13 to be reciprocated within the cylinder 11 to drive and control the control surface 1 of the aircraft (not shown). A control circuit 18 for controlling the actuator 10 receives two signals one of which is produced from the aforesaid pilot stick or fight computer 3 and the other of which is produced from a transducer 19 operatively connected with the rod 12 of the piston 13 to detect displacement of the piston 13. The control circuit 18 outputs a signal to the servo valve 16, thereby actuating the same. A fault-detecting control circuit 20 serves to detect faults in the servomechanism and to output a signal to the switching valve 15, thereby shifting the switching valve 15 to the position B thereof in which the hydraulic working oil of the hydraulic working oil source 14 is cut off. The switching valve 15 is normally shifted to the position A thereof, in which the hydraulic working oil is allowed to pass therethrough from the hydraulic working oil source 14 to the servo valve 16. At the same time, the hydraulic working oil passing through the switching valve 15 is supplied through a pilot conduit 21 to the bypass valve 17 and causes the bypass valve 17 to be shifted against a spring 17a provided in the bypass valve 17 to the position E thereof, in which the hydraulic working oil is allowed to pass through the bypass valve 17. The servo valve 16 is shiftable to the positions C, N and D thereof in response to the signal from the actuator-controlling circuit 18. When the servo valve 16 is maintained to assume the position D, the hydraulic working oil passing through the switching valve 15 is supplied through the bypass valve 17 to the left-hand side cylinder chamber 11a, so that the piston 13 is driven to move rightward in FIG. 8 and therefore the working oil is discharged from the right-hand side cylinder chamber 11b and returns through the bypass valve 17 and the servo valve 16 to an oil reservoir tank 22. Likewise, when the servo valve 16 is shifted to assume position C, the working oil is supplied to the right-hand side cylinder chamber 11b to cause the piston 13 to move leftward in FIG. 9, while the working oil is discharged from the left-hand side cylinder chamber 11a. When the transducer 19 detects the piston 13 moved to a predetermined position, the signal from the actuator-controlling circuit 18 to the servo valve 16 is interrupted and therefore the servo valve 16 is shifted to the neutral position N. As a result of the neutral position N of the servo valve 16, the supply of the working oil to the actuator 10 is interrupted and the piston 13 is stopped at the predetermined position. Thus, the control surface 1 has been controlled in response to the command of the fly computer 3.

In the event that the aforementioned servomechanism is damaged or otherwise does not work properly, the fault-detecting control circuit 20 detects the fault and interrupts the signal to the switching valve 15 as already described. As a result, the switching valve 15 is shifted to the position B where the working oil from the hydraulic working oil source 14 is cut off. At the same time, the supply of the working oil to the bypass valve 17 is interrupted, and the bypass valve 17 is shifted to the position F by the spring 17a in the valve 17 so that the cylinder chambers 11a and 11b of the actuator 10 are communicated with each other through the bypass valve 17 to bring the actuator 10 into a bypass condition on the hydraulic circuit. For this reason, this actuator 10 in general will not render an unfavorable effect on the normal operations of the other servomechanisms that are connected to the control surface in parallel and compatible relationship with the damaged servomechanism. In addition, in the case that the supply pressure of the hydraulic working source 14 was reduced abnormally because of the fault in the hydraulic working oil source 14, the bypass valve is also automatically shifted to the position F, in which the supply of the working oil to the actuator 10 is interrupted by the spring 17a. Therefore, the fault in the hydraulic working oil source 14 also will not have any effect on the normal operations of the other servomechanisms.

There have, however, been various drawbacks encountered for the conventional control apparatuses in that the actuators 2 and 2' incorporated in the servomechanism damaged for some reasons should be held in its bypass condition and separated from the remaining servomechanisms when any one of the servomechanisms are damaged or the hydraulic pressure of the hydraulic working oil source is abnormally dropped. In the event that all the servomechanisms are damaged, for example, in the event that the actuations of both the actuators 2 and 2' in FIG. 7 are interrupted, the rigidity of the control surface 1 is reduced and therefore there occurs fluttering phenomenon resulting from the vibration of the control surface 1 caused by aerodynamic disturbance. For this reason, a mass-balance weight member 7 or damper 8 is fixed to the control surface 1, as shown in FIG. 7, to alleviate the vibration of the control surface 1 and to prevent an occurrence of fluttering phenomenon. In those cases, however, there have been encountered some problems in that the whole weight of the aircraft is increased due to the mass-balance weight member or damper needed for overcoming the above problems and furthermore the mechanical efficiency in the control of the control surfaces is reduced to a relatively how level since the resistance of the control surface becomes at an unduly high level under the normal operation of the control apparatus.

In order to overcome the above mentioned drawbacks and problems, there has so far been proposed another control apparatus which is disclosed in the Japanese patent laid-open publication No. 1-41498. The control apparatus herein disclosed is shown in FIG. 9 as comprising a bypass valve 30 having a bypass circuit 31 incorporated therein, and a control valve 32 provided in the bypass circuit 31. The control valve 32 is constituted by an electromagnet valve shiftable between a bypass position G in which the hydraulic chambers 11a and 11b of the actuators 11 are held in non-restrictive and thus smooth communication with each other by way of the bypass passageway 31 and a dumping position H in which the hydraulic chambers 11a and 11b of the actuators 11 are held in restrictive communication with each other by way of the bypass passageway 31. The electromagnet valve is operated to be shifted between the bypass position G and the dumping position H in response to the output signals from a damage detecting circuit provided in each of the servomechanisms. When any one of the servomechanisms happens to be damaged for some reasons, the control valve 32 is shifted to the bypass position G. At this time, the switching valve 15 is interrupted while the bypass valve 30 is shifted from the position G1 to the position H1 so that the bypass circuit 31 allows the hydraulic chambers 11a and 11b of the actuator 11 to be held in communication with each other. When all of the servomechanisms are, on the other hand, damaged, the control valve 32 is shifted to the dumping position H in which the hydraulic chambers 11a and 11b of the actuator 11 are held in restrictive communication with each other, thereby resulting in preventing the fluttering phenomenon of the control surface of the aircraft without any mass-balance weight member and dumper, and thus alleviating the whole weight of the aircraft.

The conventional control apparatus, however, entails such drawbacks that the number of parts and elements to be incorporated in the control circuit is increased, thereby resulting in not only increase of the whole weight of the aircraft but also enhancement of the manufacturing cost for those parts and elements by the reason that the control valve 32 is provided in the bypass circuit 31 incorporated in the bypass valve 30 which is, in turn, formed with the switching valve 15 for selectively supplying and interrupting the working oil to the bypass valve 30. More specifically, the amount of the hydraulic working passing through the switching valve 15 and the control valve 32 is substantially equal to that of the hydraulic working oil passing through the hydraulic chambers 11a and 11b of the actuator 10. As result of the equal amount of the hydraulic working oil passing through between the switching valve 15 and the control valve 32 and the actuator 10, the larger the body of the aircraft becomes the larger amount of hydraulic working oil is consumed. In addition, the control valve 32 is required to be operated for assuming any one of the bypass and dumping positions G and H when the hydraulic working oil is not required to be fed to the control valve 32 while the working oil is maintained at a low level or otherwise zero level. This results in the fact that an extraordinarily large electromagnet is required as the control valve. This entails such drawbacks as the increases of the control apparatus and the manufacturing cost of the control apparatus, as well as the increases the whole weight of the aircraft and the manufacturing cost of the aircraft.

The present invention contemplates provision of a control apparatus for a control surface of a aircraft overcoming these drawbacks of the prior art control apparatus of the described general natures.

SUMMARY OF THE INVENTION

According to one aspect of the present invention there is provided a control apparatus comprising a plurality of servomechanisms for controlling the control surface of the aircraft and control signal producing means for producing first and second control signals to the servomechanisms, the first control signal of the control signal producing means being produced to at least one of the servomechanisms which happens to be damaged, and the second control signal of the control signal producing means being produced to all of the servomechanisms which happen to be damaged, each of the servomechanisms comprising: a hydraulic working oil source for supplying hydraulic working oil under pressure; a hydraulic working oil reservoir for reserving the hydraulic working oil; an actuator assembly for driving the control surface of the aircraft, the actuator assembly having a cylinder member and a piston member slidably received in the cylinder member, the cylinder member and the piston member collectively defining a pair of hydraulic chambers, the piston member being operatively connected to the control surface of the aircraft; a control valve held in fluid communication with the hydraulic chambers of the actuator assembly through a pair of fluid passageways, with the hydraulic working oil source and with the hydraulic working oil reservoir, the control valve being operative to assume a first control valve position in which the hydraulic working oil is supplied from the hydraulic working oil source to one of the hydraulic chambers through the control valve and discharged from the other of the hydraulic chambers to the hydraulic working oil reservoir through the control valve to force the piston member of the actuator assembly to be moved in a first driving direction, a second control valve position in which the hydraulic working oil is supplied from the hydraulic working oil source to the other of the hydraulic chambers through the control valve and discharged from the one of the hydraulic chambers to the hydraulic working oil reservoir through the control valve to force the piston member of the actuator assembly to be moved in a second driving direction, and a third control valve position in which the hydraulic working oil is interrupted from being supplied from the hydraulic working oil source to the hydraulic chambers of the actuator assembly and discharged from the hydraulic chambers of the actuator assembly to the hydraulic working reservoir through the control valve to prevent the piston member of the actuator assembly from being moved; a switching valve provided on the pair of fluid passageways between the actuator assembly and the control valve to be held in fluid communication with the hydraulic chambers of the actuator assembly and the control valve and having a throttle valve member, the switching valve being operative to assume a first switching valve position in which the hydraulic working oil is permitted to be supplied from the hydraulic working oil source alternatively to one and the other of the hydraulic chambers and discharged alternatively from one of the other the hydraulic chambers of the actuator assembly to the hydraulic working oil reservoir to move the piston member of the actuator assembly alternatively in the first and second directions in the state of the first and second control valve positions of the control valve, a second switching valve position in which the hydraulic working oil is interrupted from being supplied from the hydraulic working oil source to the hydraulic chambers of the actuator assembly and from being discharged from the hydraulic chambers of the actuator assembly to the hydraulic working oil reservoir to cause the hydraulic chambers of the actuator assembly to be held in fluid communication with each other through the pair of fluid passageways, and a third switching valve position in which the hydraulic working oil is interrupted from being supplied from the hydraulic working oil source to the hydraulic chambers of the actuator assembly and from being discharged from the hydraulic chambers of the actuator assembly to the hydraulic working oil reservoir to cause the hydraulic chambers of the actuator assembly to be held in fluid communication with each other through the throttle valve member and the pair of fluid passageways; first change-over means for causing the switching valve to assume the second switching valve position in response to the first control signal from the control signal producing means; and second changeover means for causing the switching valve to assume the third switching valve position in response to the second control signal from the control signal producing means.

According to another aspect of the present invention there is provided a control apparatus, comprising a plurality of servomechanisms for controlling a control surface of an aircraft, each of the servomechanisms comprising: a hydraulic working oil source for supplying working oil under pressure; a hydraulic working oil reservoir for reserving the hydraulic working oil; an actuator assembly for driving the control surface of the aircraft, the actuator assembly having a cylinder member, and a piston member slidably received in the cylinder member, the cylinder member and the piston member collectively defining a pair of hydraulic chambers, the piston member being operably connected to the control surface of the aircraft; a control valve held in fluid communication with the hydraulic chambers of the actuator assembly through a pair of fluid passageways, with the hydraulic working oil source and with the hydraulic working oil reservoir, the control valve being operative to assume a first control valve position in which the hydraulic working oil is supplied from the hydraulic working oil source to one of the hydraulic chambers through the control valve and discharged from the other of the hydraulic chambers to the hydraulic working oil reservoir through the control valve to force the piston member of the actuator assembly to be moved in a first driving direction, a second control valve position in which the hydraulic working oil is supplied from the hydraulic working oil source to the other of the hydraulic chambers through the control valve and discharged from the one of the hydraulic chambers to the hydraulic working oil reservoir through the control valve to force the piston member of the actuator assembly to be moved in a second driving direction, and a third control valve position in which the hydraulic working oil is interrupted from being supplied from the hydraulic working oil source to the hydraulic chambers of the actuator assembly and discharged from the hydraulic chambers of the actuator assembly to the hydraulic working reservoir through the control valve to prevent the piston member of the actuator assembly from being moved; a check valve provided on one of the pair of the fluid passageways to be held in fluid communication with the control valve and one of the hydraulic chambers of the actuator assembly and having at least a pilot port, the check valve being operative to assume a first check valve position in which the hydraulic working oil is permitted to be supplied from the control valve to the one of the hydraulic chambers of the actuator assembly through the check valve and interrupted from being supplied from the one of the hydraulic chambers of the actuator assembly to the control valve through the check valve and a second check valve position in which the hydraulic working oil is permitted to be supplied alternatively from the control valve to the one of the hydraulic chambers of the actuator assembly and from the one of the hydraulic chambers of the actuator assembly to the control valve through the check valve, and the check valve assuming second check valve position under the condition that the hydraulic working pressure is raised at the pilot port of the check valve to the predetermined pressure level; a relief valve held in fluid communication with the one of the hydraulic chambers of the actuator assembly and the control valve through a bypass passageway bypassing the check valve, the relief valve having a relief valve port held in fluid communication with the bypass passageway between the relief valve and the actuator assembly to permit the hydraulic working oil passing through the bypass passageway to be supplied from the one of the hydraulic chambers of the actuator assembly to the control valve through the relief valve when the hydraulic working oil pressure is raised in the bypass passageway between the relief valve and the actuator assembly to a predetermined pressure level; and pilot pressure control means held in fluid communication with the pilot port of the check valve through a fluid pilot passageway to supply the hydraulic working oil to the pilot port of the check valve until the hydraulic working pressure is raised at the pilot port of the check valve to the predetermined pressure level when the control valve assumes the first and second control valve positions and when the relief valve permits the hydraulic working oil passing through the bypass passageway to be supplied from the one of the hydraulic chambers of the actuator assembly to the control valve through the relief valve.

BRIEF DESCRIPTION OF THE DRAWINGS

The features and advantages of the control apparatus in accordance with the present invention will be more clearly understood from the following description take in conjunction with the accompanying drawings in which.

DESCRIPTION OF THE PREFERRED EMBODIMENTS

A control apparatus according to the present invention comprises a plurality of servomechanisms for controlling a control surface of an aircraft and control signal producing means for producing first and second control signals to the servomechanisms. A preferred embodiment of the control apparatus will be described hereinlater on the assumption that the control apparatus is provided with two servomechanisms.

Figure 1:
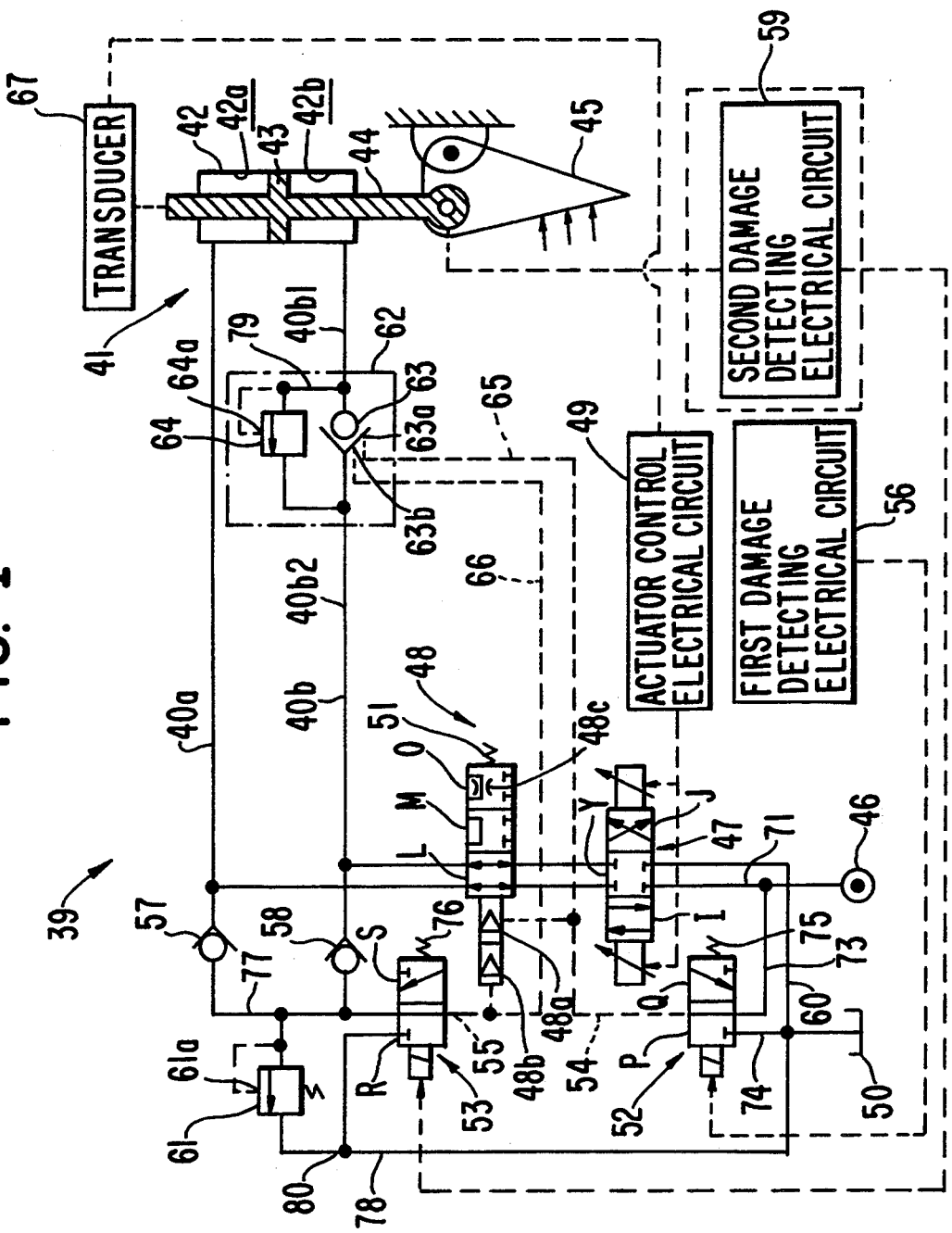
FIG. 1 is a schematic view showing a hydraulic circuit of a preferred embodiment of the control apparatus according to the present invention.

FIG. 1 shows one of the servomechanisms, the control surface and the control signal producing means. The other of the servomechanisms are similar in constitution to the servomechanism shown in FIG. 1 and not shown. Referring to FIG. 1, the servomechanism is generally indicated at the reference numeral 39 and comprises a hydraulic working oil source 46 for supplying hydraulic working oil under pressure and a hydraulic working oil reservoir 50 for reserving the hydraulic working oil. The servomechanism 39 further comprises an actuator assembly which generally indicated at the reference numeral 41 for driving the control surface 45 of the aircraft. The actuator assembly 41 comprises a cylinder member 42 and a piston member 43 slidably received in the cylinder member 42. The cylinder member 42 and the piston member 43 collectively defines a pair of hydraulic chambers 42a and 42b. The piston member 43 is operatively connected to the control surface 45 by way of a rod member 44 integrally formed with the piston member 43.

The servomechanism further comprises a control valve 47 which is held in fluid communication with the hydraulic chambers 42a and 42b of the actuator assembly 41 through a pair of fluid passageways 40a and 40b. Similarly, the control valve 47 is held in fluid communication with the hydraulic working oil source 46 through a fluid feed passageway 71 and with the hydraulic working oil reservoir 50 through a fluid discharge passageway 60. The control valve 47 is adapted to be shiftable to assume three different positions consisting of first, second and third control valve positions I, J and Y. When the control valve 47 is shifted to assume a first control valve position I, the hydraulic working oil is supplied from the hydraulic working oil source 46 to the hydraulic chamber 42a through the control valve 47 and discharged from the hydraulic chamber 42b to the hydraulic working oil reservoir 50 through the control valve 47. At this time, the piston member 43 of the actuator assembly 41 is forced by the hydraulic working oil pressure to moved downwardly in FIG. 1. When the control valve 47 is shifted to assume a second control valve position J, the hydraulic working oil is supplied from the hydraulic working oil source 46 to the hydraulic chamber 42b through the control valve 47 and discharged from the hydraulic chamber 42a to the hydraulic working oil reservoir 50 through the control valve 47. At this time, the piston member 43 of the actuator assembly 41 is forced by the hydraulic working oil pressure to be moved upwardly in FIG. 1. When the control valve 47 is shifted to assume a third control valve position Y as shown in FIG. 1, the hydraulic working oil is interrupted from being supplied from the hydraulic working oil source 46 to the hydraulic chambers 42a and 42b of the actuator assembly 41 and discharged from the hydraulic chambers 42a and 42b of the actuator assembly 41 to the hydraulic working reservoir 50 through the control valve 47, thereby preventing the piston member 43 of the actuator assembly 41 from being moved. In addition, the valve position of the control valve 47 is switched depending upon a control signal which is produced by an actuator control electrical circuit 49 in response to a control command of a pilot or a flight control computer of the aircraft and a detecting electrical signal based on the displacement of the piston member 43 of the actuator assembly which is detected by a transducer 67 electrically connected to the actuator control electrical circuit 49.

The servomechanism 39 further comprises a switching valve 48 which is provided on the pair of fluid passageways 40a and 40b between the actuator assembly 41 and the control valve 47 to be held in fluid communication with the hydraulic chambers 42a and 42b of the actuator assembly 41 and the control valve 47. The switching valve 48 is designed to shiftable to assume three different positions consisting of a first, second and third switching valve conditions L, M and O. When the switching valve 48 is shifted to assume a first switching valve position L as shown in FIG. 1, the hydraulic working oil is permitted to be supplied from the hydraulic working oil source 46 alternatively to one and the other of the hydraulic chambers 42a and 42b and discharged alternatively from one of the other the hydraulic chambers 42 and 42b of the actuator assembly 41 to the hydraulic working oil reservoir 50. At this time, the piston member 43 of the actuator assembly 41 is alternatively moved upwardly and downwardly in FIG. 1 in the state of the first and second control valve positions I and J of the control valve 47. When the switching valve 48 is shifted to assume the second switching valve position M, the hydraulic working oil is interrupted from being supplied from the hydraulic working oil source 46 to the hydraulic chambers 42a and 42b of the actuator assembly 41 and from being discharged from the hydraulic chambers 42a and 42b of the actuator assembly 41 to the hydraulic working oil reservoir 50. At the same time, the hydraulic chambers 42a and 42b of the actuator assembly 41 are caused to be held in fluid communication with each other through the pair of fluid passageways 40a and 40b. In addition, the switching valve 48 has a throttle valve member 48c. When the switching valve 48 is shifted to assume the third switching valve position O, the hydraulic working oil is interrupted from being supplied from the hydraulic working oil source 46 to the hydraulic chambers 42a and 42b of the actuator assembly 41 and from being discharged from the hydraulic chambers 42a and 42b of the actuator assembly 41 to the hydraulic working oil reservoir 50. At the same time, the hydraulic chambers 42a and 42b of the actuator assembly 41 are caused to be held in fluid communication with each other through the throttle valve member 48c and the pair of fluid passageways 40a and 40b. The switching valve 48 also includes first and second pilot ports 48a and 48b. At least when the hydraulic working oil pressure at the first pilot port 48a is raised to a first predetermined pilot pressure, the switching valve 48 is shifted to assume the first switching valve position L against a compression spring 51. Both when the hydraulic working oil pressure at the second pilot port 48b of the switching valve 48 is raise to a predetermined second pilot pressure and when the hydraulic working oil pressure at the first pilot port 48a is not raised to the first predetermined pilot pressure, the switching valve 48 is shifted to assume the second switching valve position M against the compression spring 51. When the hydraulic working oil pressures at the first and second pilot ports 48a and 48b are not raised to the first and second predetermined pilot pressures, respectively, the compression spring 51 causes the switching valve 48 to assume the third switching valve position O.

The servomechanism 39 further comprises first changeover means for causing the switching valve 48 to assume the second switching valve position M in response to a first control signal from the control signal producing means, and second change-over means for causing the switching valve 48 to assume the third switching valve position O in response to the second control signal from the control signal producing means. The first change-over means is constituted by a first electromagnetic valve 52 and a compression spring 75, while the second change-over means is constituted by a second electromagnetic valve 53 and a compression spring 76. The constitutions and functions of the first and second electromagnetic valves 52 and 53 will be specifically described hereinafter.

The servomechanism 39 further comprises a first check valve 58 and a second check valve 57. The first check valve 58 is held in fluid communication with the hydraulic chamber 42b of the actuator assembly 41 and the switching valve 48 through the fluid passageway 40b and with the second electromagnetic valve 53. The first check valve 58 is of such a constitution as to permit the hydraulic working oil to be supplied from the hydraulic camber 42b of the actuator assembly 41 to the second electromagnetic valve 53 and to interrupt the hydraulic working oil from being supplied from the second electromagnetic valve 53 to the hydraulic chamber 42b of the actuator assembly 41. The second check valve 57 is held in fluid communication with the hydraulic chamber 42a of the actuator assembly 41 and the switching valve 48 through the fluid passageway 40a and with the second electromagnetic valve 53 and the hydraulic chamber 42a of the actuator assembly 41. The second check valve 57 is so constructed as to permit the hydraulic working oil to be supplied from the hydraulic chamber 42a of the actuator assembly 41 to the second electromagnetic valve 53 and to interrupt the hydraulic working oil from being supplied from the second electromagnetic valve 53 to the hydraulic chamber 42a of the actuator assembly 41.

The aforementioned first electromagnetic valve 52 is held in fluid communication with the first pilot port 48a of the switching valve 48 through a first fluid pilot passageway 54, with the hydraulic working oil source 46 through a fluid passageway 73 and with the hydraulic working oil reservoir 50 through a fluid passageway 74. The first electromagnetic valve 52 is adapted to be shiftable to assume two different positions consisting of first and second electromagnetic valve positions P and Q. When the first electromagnetic valve 52 is shifted to assume the first electromagnetic valve position P as shown in FIG. 1, the hydraulic working oil is permitted to be supplied from the hydraulic working oil source 46 to the first pilot port 48a of the switching valve 48 through the first electromagnetic valve 52 until the hydraulic working oil pressure is raised at the first pilot port 48a of the switching valve 48 to the predetermined first pilot pressure level. When the first electromagnetic valve is shifted to assume the second electromagnetic valve position Q, the hydraulic working oil is discharged from the first pilot port 48a of the switching valve 48 to the hydraulic working oil reservoir 50 through the first electromagnetic valve 52 until the hydraulic working oil pressure is reduced to the extent of a zero level.

On the other hand, the second electromagnetic valve is held in fluid communication with the second pilot port 48b of the switching valve 48 through a second fluid pilot passageway 55, with the first and second check valves 58 and 57 through a fluid leak passageway 77 and with the hydraulic working oil reservoir 50 through a fluid discharge passageway 78. The second electromagnetic valve 53 is adapted to be shiftable to assume different positions consisting of a first and second electromagnetic valve positions R and S. When the second electromagnetic valve 53 is shifted to assume the first electromagnetic valve position R as shown in FIG. 1, the hydraulic working oil is permitted to be supplied from the hydraulic chambers 42a and 42b of actuator assembly 41 to the second pilot port 48b of the switching valve 48 through the first and second check valves 58 and 57 and the second electromagnetic valve 53 until the working oil pressure is raised at the second pilot port 48b of the switching valve 48 to the predetermined second pilot pressure level. When the electromagnetic valve 53 is shifted to assume the second electromagnetic valve position S, the hydraulic working oil is discharged from the second pilot port 48b of the switching valve 48 to the hydraulic working oil reservoir 50 through the second electromagnetic valve 53 until the hydraulic working oil pressure is reduced to the extent of a zero level.

In the meantime, the aforementioned first control signal is produced by the control signal producing means to at least one of the servomechanisms which happens to be damaged, while the aforesaid second control signal is produced by the control signal producing means to all of the servomechanisms which happen to be damaged. The first electromagnetic valve 52 is shifted to assume the second electromagnetic valve position Q in response to the first control signal of the control signal producing means, whilst the second electromagnetic valve 53 is shifted to assume the second electromagnetic valve position S in response to the second control signal of the control signal producing means. The control signal producing means is constituted by first and second damage detecting electrical circuits indicated at the reference numerals 56 and 59, respectively. The first damage detecting electrical circuit 56 is designed to be capable of detecting the damage of the servomechanism 39 and, in an ordinary way, applies an electrical current to a solenoid of the first electromagnetic valve to excite the solenoid so that the first electromagnetic valve is shifted to assume the first electromagnetic valve position P against the compression spring 75. If the damage of the servomechanism 39 is detected by the first damage detecting electrical circuit 56, the electrical current is prevented by the first damage detecting electrical circuit 56 from being applied to the solenoid of the first the electromagnetic valve 52, thereby resulting in the fact that the compression spring 75 causes the valve position of the first electromagnetic valve 52 to be switched from the first electromagnetic valve position P to the second electromagnetic valve position Q. The second damage detecting electrical circuit 59 is adapted to be capable of detecting the damage of the other unillustrated servomechanism and, in an ordinary way, applies an electrical current to a solenoid of the second electromagnetic valve to excite the solenoid so that the second electromagnetic valve is shifted to assume the second electromagnetic valve position R against the compression spring 76. If, on the other hand, the damage of the illustrated servomechanism is detected by the second damage detecting electrical circuit 59, the electrical current is prevented by the second damage detecting electrical circuit 59 from being applied to the solenoid of the second the electromagnetic valve 53, thereby resulting in the fact that the compression spring 76 causes the valve position of the second electromagnetic valve 53 to be switched from the first electromagnetic valve position R to the second electromagnetic valve position S.

The servomechanism 39 further comprises a safety valve 61 held in fluid communication with the fluid leak passageway 77 between the first and second check valves 58 and 57 and the second electromagnetic valve 53 and with the hydraulic working oil reservoir 50 through a fluid discharge passageway 80. The safety valve 61 includes a safety valve port 61a held in fluid communication with the fluid leak passageway 77. The hydraulic working oil is permitted to be supplied from the first and second check valves 58 and 57 to the hydraulic working oil reservoir 50 when the hydraulic working oil pressure in the fluid leak passageway 77 exceeds a predetermined pressure level.

The servomechanism 39 further comprises a third check valve 63 which is provided on the fluid passageway 40b to be held in fluid communication with the switching valve 48 and the hydraulic chamber 42b of the actuator assembly 41. The third check valve 63 is equipped with first and second pilot ports 63a and 63b and adapted to be shiftable to assume two different positions of consisting of a first and second valve positions. When the third check valve 63 is shifted to assume the first valve position, the hydraulic working oil is permitted to be supplied from the switching valve 48 to the hydraulic chamber 42b of the actuator assembly 41 through the third check valve 63 and interrupted from being supplied from the hydraulic chamber 42b of the actuator assembly 41 to the switching valve 48 through the third check valve 63. When the third check valve 63 is shifted to assume the second valve position, the hydraulic working oil is permitted to be supplied alternatively from the switching valve 48 to the hydraulic chamber 42b of the actuator assembly 41 and from the hydraulic chamber 42b of the actuator assembly 41 to the switching valve 48 through the third check valve 63. The first pilot port 63a of the third check valve 63 is held in fluid communication with the first fluid pilot passageway 54 between the first electromagnetic valve 52 and the first pilot port 48a of the switching valve 48 through a first fluid pilot branch passageway 65. As a consequence, the hydraulic working oil pressure at the first pilot port 63a of the third check valve 63 is caused to be equal to the hydraulic working oil pressure at the first pilot port 48a of the switching valve 48. The second pilot port 63b of the third check valve 63 is held in fluid communication with the second fluid pilot passageway 55 between the second electromagnetic valve 53 and the second pilot port 48b of the switching valve 48 through a second fluid pilot branch passageway 66. This results in the fact that the hydraulic working oil pressure at the second pilot port 63b of the third check valve 63 is caused to be equal to the hydraulic working oil pressure at the second pilot port 48b of the switching valve 48. The third check valve 63 is shifted to assume the second valve position when the hydraulic working oil pressure is raised at the first pilot port 63a of the third check valve 63 to a predetermined first pilot pressure level and when the hydraulic working oil pressure is raised at the second pilot port 63b of the third check valve 63 to the predetermined second pilot pressure level. The fluid passageway 40b is constituted by a fluid passageway 40b1 between actuator assembly 41 and the third check valve 63, and a fluid passageway 40b2 between the third check valve 63 and the switching valve.

The servomechanism 39 further comprises a relief valve 64 held in fluid communication with the one of the hydraulic chambers 42a and 42b of the actuator assembly 41 and the switching valve 48 through a bypass passageway 79 bypassing the third check valve 63. The relief valve 64 is provided with a relief valve port 64a held in fluid communication with the bypass passageway 79 between the relief valve 64 and the actuator assembly 41. The hydraulic working oil passing through the bypass passageway 79 is permitted to be supplied from the hydraulic chamber 42b of the actuator assembly 41 to the switching valve 48 through the relief valve 64 when the hydraulic working oil pressure is raised in the bypass passageway 79 between the relief valve 64 and the actuator assembly 41 to a predetermined pressure level.

Figure 2:
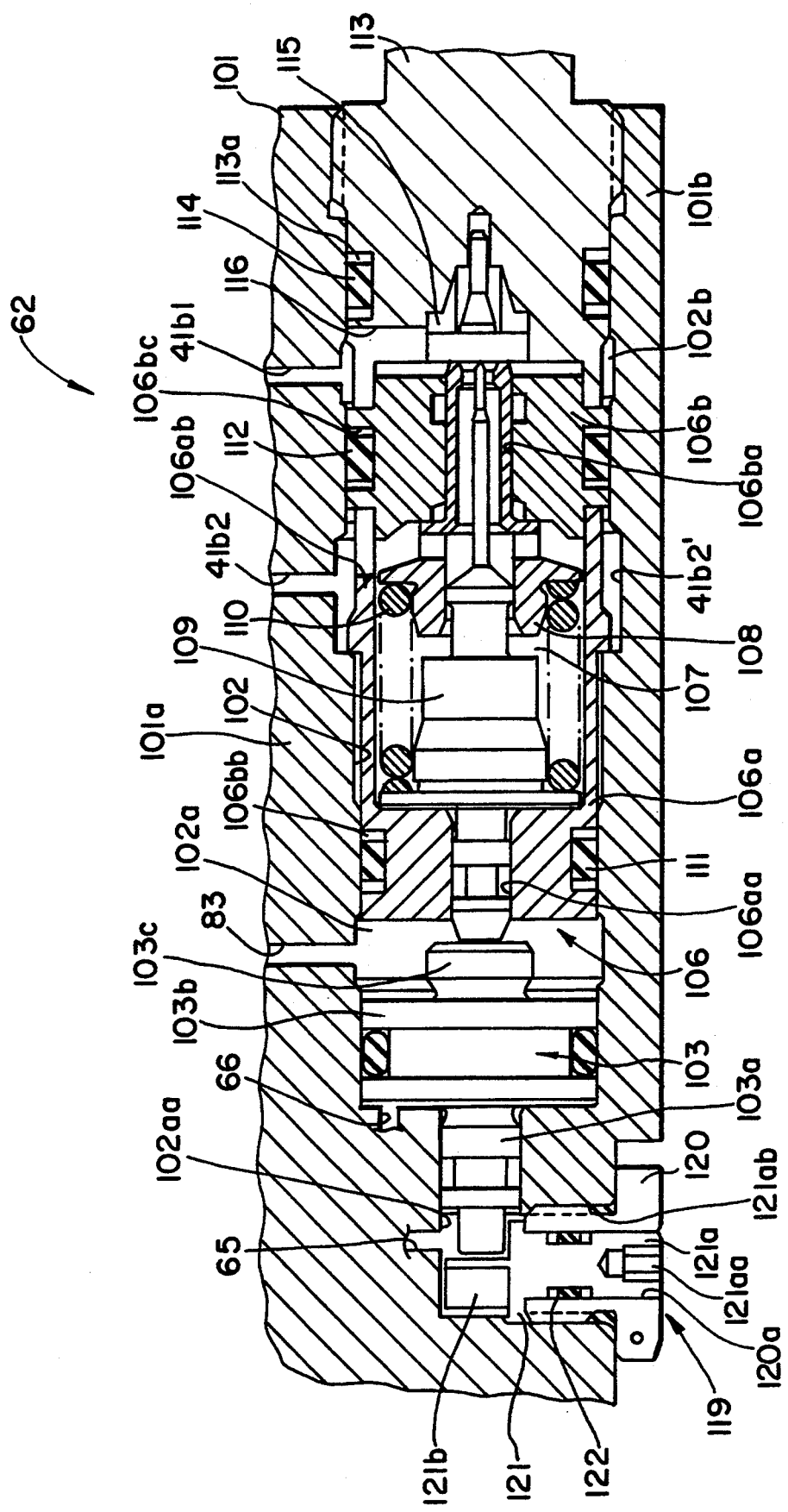
FIG. 2 is a combination valve unit comprising a check valve and relief valve both of which are incorporated in a single unit in the embodiment of the control apparatus according to the present invention.

The check valve 63 and the relief valve 64 are shown in particular in FIG. 2 as being integrally formed with each other and accommodated in a common valve housing to be handled in a single unit. In the embodiment herein shown in FIG. 2, the check valve 63 and the relief valve 64 is assumed as constituting a combination valve unit which is generally indicated at 62 and housed in a valve housing 101 having a cylindrical through bore 102 formed therein to extend along the center axis thereof. The valve housing 101 has first and second axial half portions 101a and 101b extending along the center axis of the through bore 102 and surrounding the through bore 102. The through bore 102 has first and second axial half bore portions 102a and 102b surrounded by the first and second axial half portions 101a and 101b, respectively, of the valve housing 101. The first axial half bore portion 102a of the through bore 102 has a small diameter section 102aa remote from the second axial half bore portion 102b of the through bore 102 and a large diameter section 102ab adjacent to the second axial half bore portion 102b of the through bore 102. The second axial half portion 101b of the valve housing 101 is formed with the fluid passageways 40b1 and 40b2 spaced apart from each other along the center axis of the through bore 102 and held in fluid communication with the hydraulic chamber 42b of the actuator assembly 41 and the switching valve 48, respectively. The fluid passageway 40b1 is so formed in the second axial half portion 101b of the valve housing 101 to terminate at the fluid port 42b1' open to the second axial half bore portion 102b of the through bore 102, while the fluid passageway 40b2 is so formed in the second axial half portion 101b of the valve housing 101 to terminate at the fluid port 42b2' open to the second axial half bore portion 102b of the through bore 102. On the other hand, the first half portion 101a of the valve housing 101 is formed with the pilot fluid passageways 65 and 66 spaced apart from each other along the center axis of the through bore 102 and held in fluid communication with the first and second electromagnetic valves 52 and 53. The first fluid pilot branch passageway 65 is so formed in the first axial half portion 101a of the valve housing 101 to terminate at the first fluid pilot port 63a open to the small diameter section 102aa of the first axial half bore portion 102a of the through bore 102, while the second fluid pilot passage 66 is so formed in the first axial half portion 101a of the valve housing 101 to terminate at the second fluid pilot port 63b open to the large diameter section 102ab of the first axial half bore portion 102a of the through bore 102. A discharge fluid passageway 83 is formed in the first axial half portion 101a of the valve housing 101 between the fluid passageways 41b1, 41b2 and the pilot fluid passageways 65 and 66 to terminate at the first axial half bore portion 102a of the through bore 102.

Figure 3:
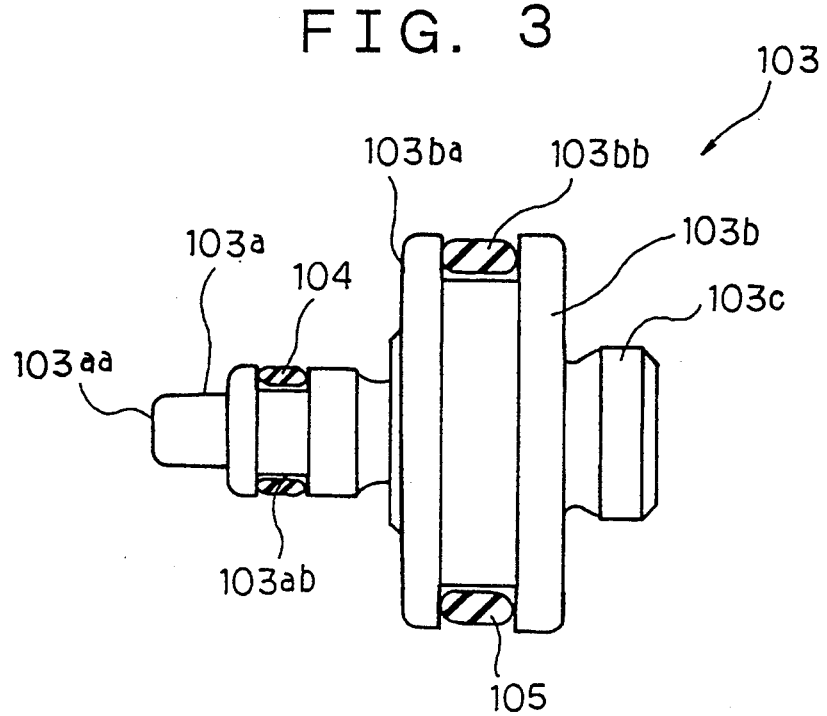
FIG. 3 is an enlarged plan view of a piston member to be incorporated into the combination valve unit shown in FIG. 2.

A cylindrical piston member 103 is received in the first axial half bore portion 102a of the cylindrical through. bore 102 in axial alignment with the through bore 102 and slidably movable along the center axis of the through bore 102. The cylindrical piston member 103 is best shown in FIG. 3 as being having a small diameter portion 103a axially slidably received in the small diameter section 102aa of the first axial half bore portion 102a of the through bore 102 and a large diameter portion 103b integrally formed with the small diameter portion 103a and axially slidably received in the large diameter section 102ab of the first axial half bore portion 102a of the through bore 102. The piston member 103 is formed with an axial protrusion portion 103c projecting in a direction opposite with respect to the small diameter portion 103a across the large diameter portion 103b. The small diameter portion 103a of the piston member 103 has a pressure acting face 103aa for receiving the fluid pressure of the working oil supplied through the first fluid pilot branch passageway 65 in the small diameter section 102aa of the first axial half bore portion 102a of the through bore 102, while the large diameter portion 103b of the piston member 103 has a pressure acting face 103ba for receiving the fluid pressure of the working oil supplied through the second fluid pilot branch passageway 66 in the large diameter section 102ab of the first axial half bore portion 102a of the through bore 102. The area of the pressure acting face 103aa of the small diameter portion 103a of the piston member 103 is smaller than that of the pressure acting face 103ba of the large diameter portion 103b of the piston member 103. The small diameter portion 103a of the piston member 103 is formed with an annular groove 103ab having a seal ring 104 received therein. Similarly, the large diameter portion 103b of the piston member 103 is formed with an annular groove 103bb having a seal ring 105 received therein.

Figure 5:
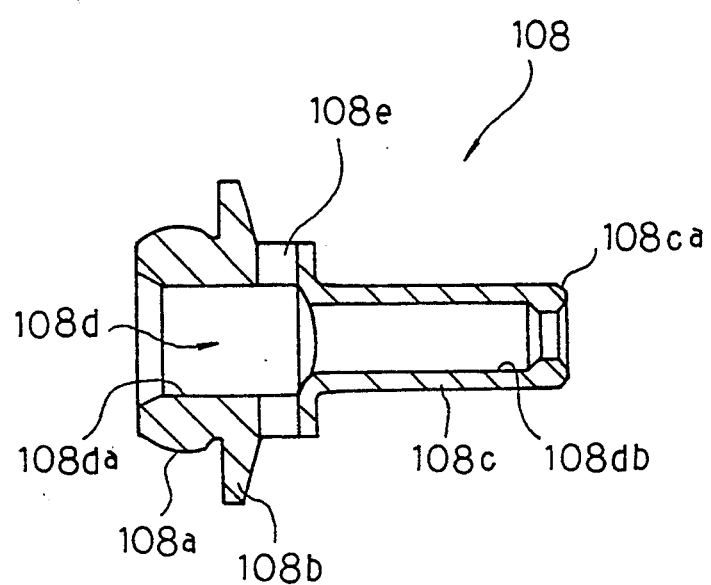
FIG. 5 is an enlarged plan view of a valve seat member to be incorporated into the combination valve unit shown in FIG. 2.
Figure 6:
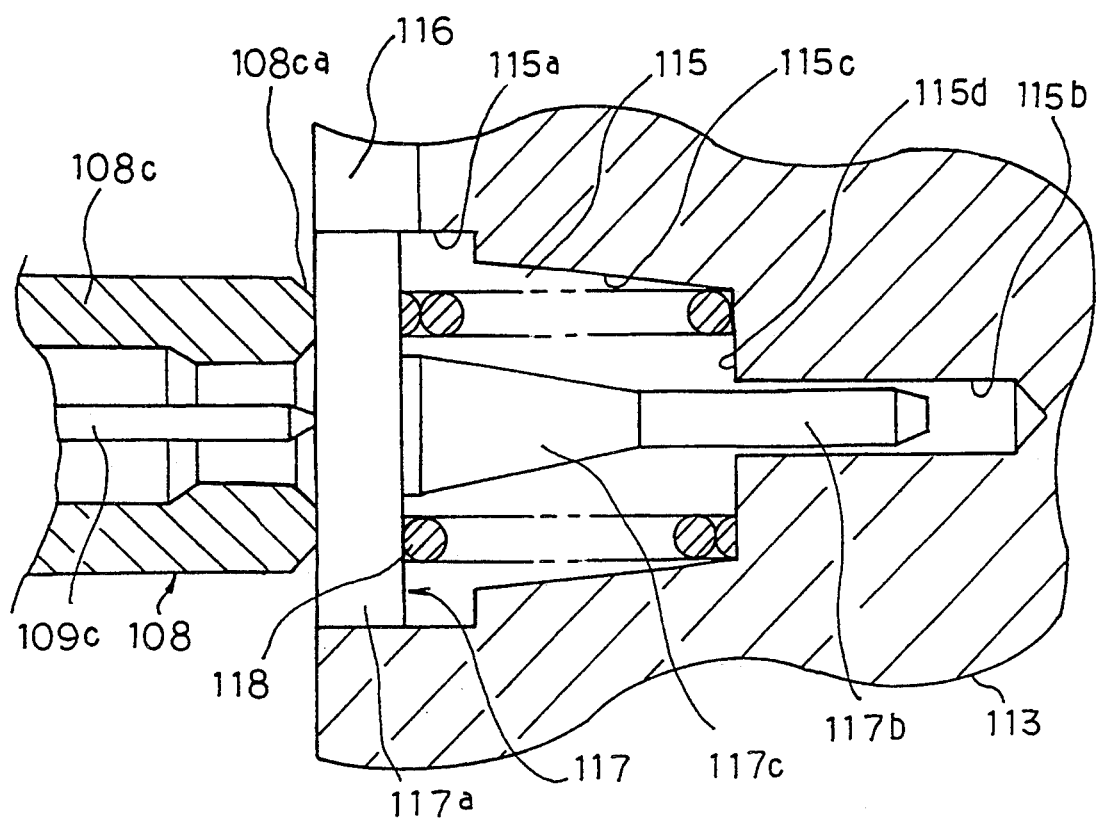
FIG. 6 is an enlarged but fragmentary cross-sectional view of constitutional parts of the combination valve unit shown in FIG. 2 as including a popper valve, part of the valve seat member and part of the plug member.
Figure 7:
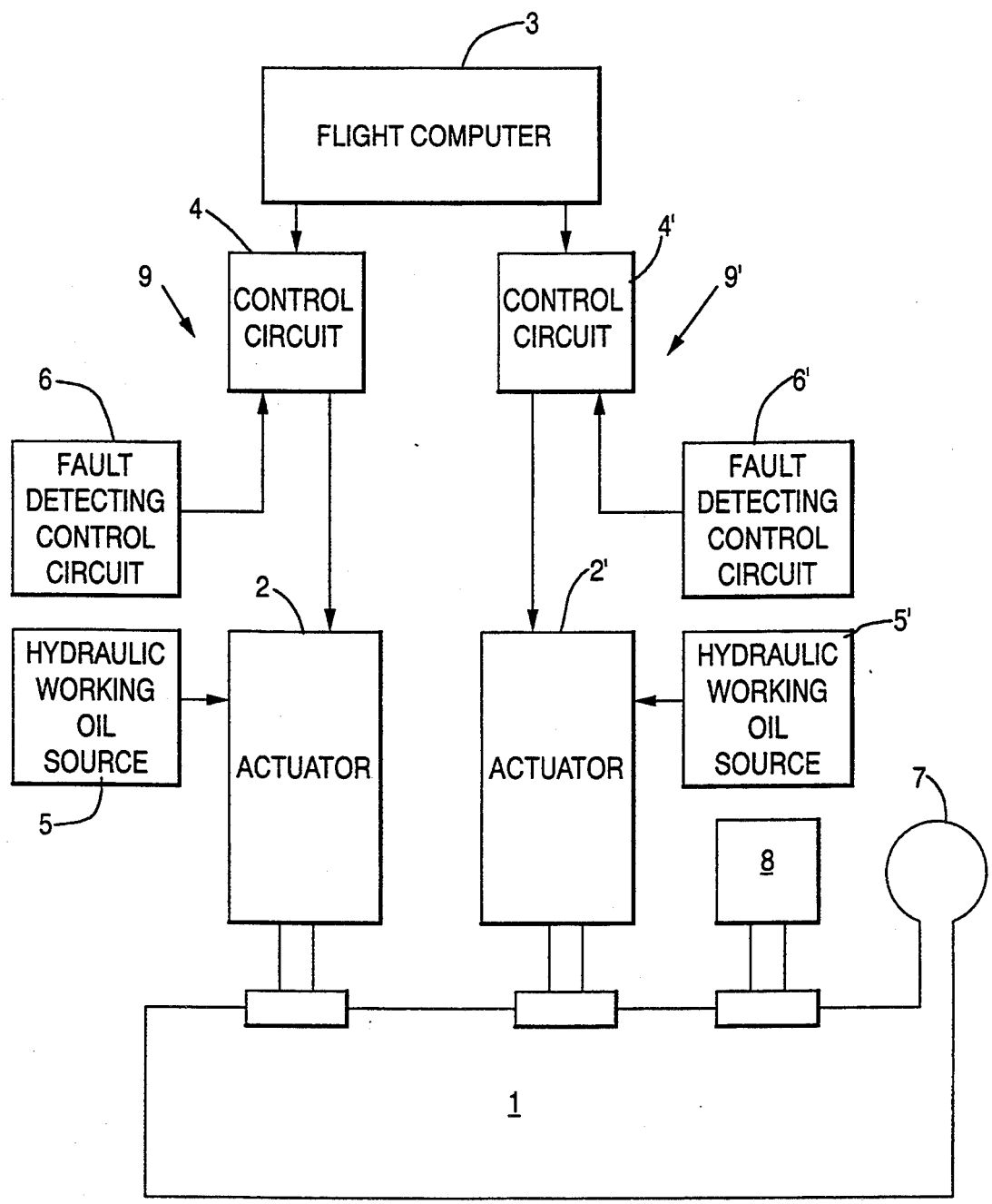
FIG. 7 is a block diagram outlining the hydraulic circuit of a conventional control apparatus.
Figure 8:
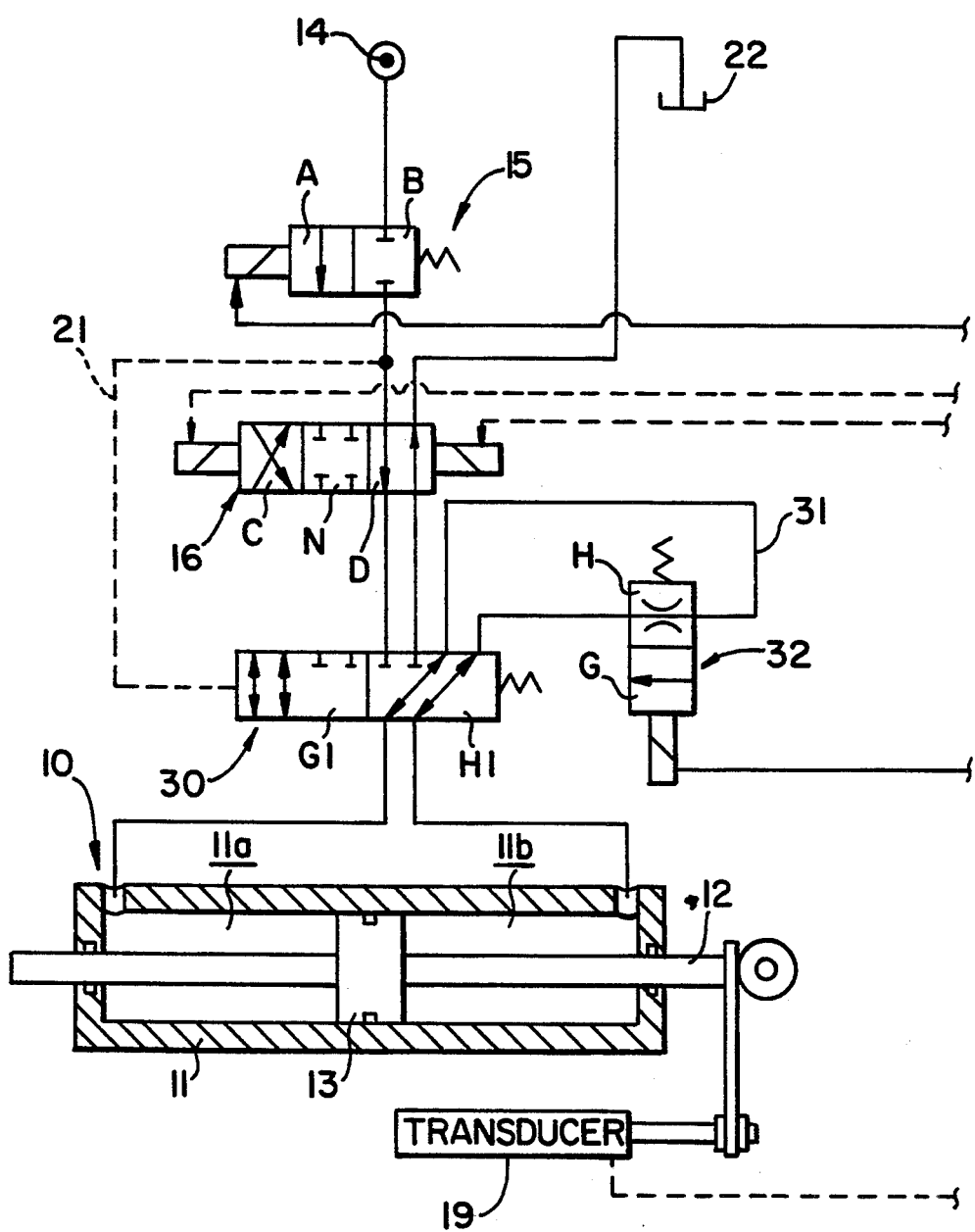
FIG. 8 is a schematic view showing one of the hydraulic circuits for use in the conventional control apparatus.
Figure 9:
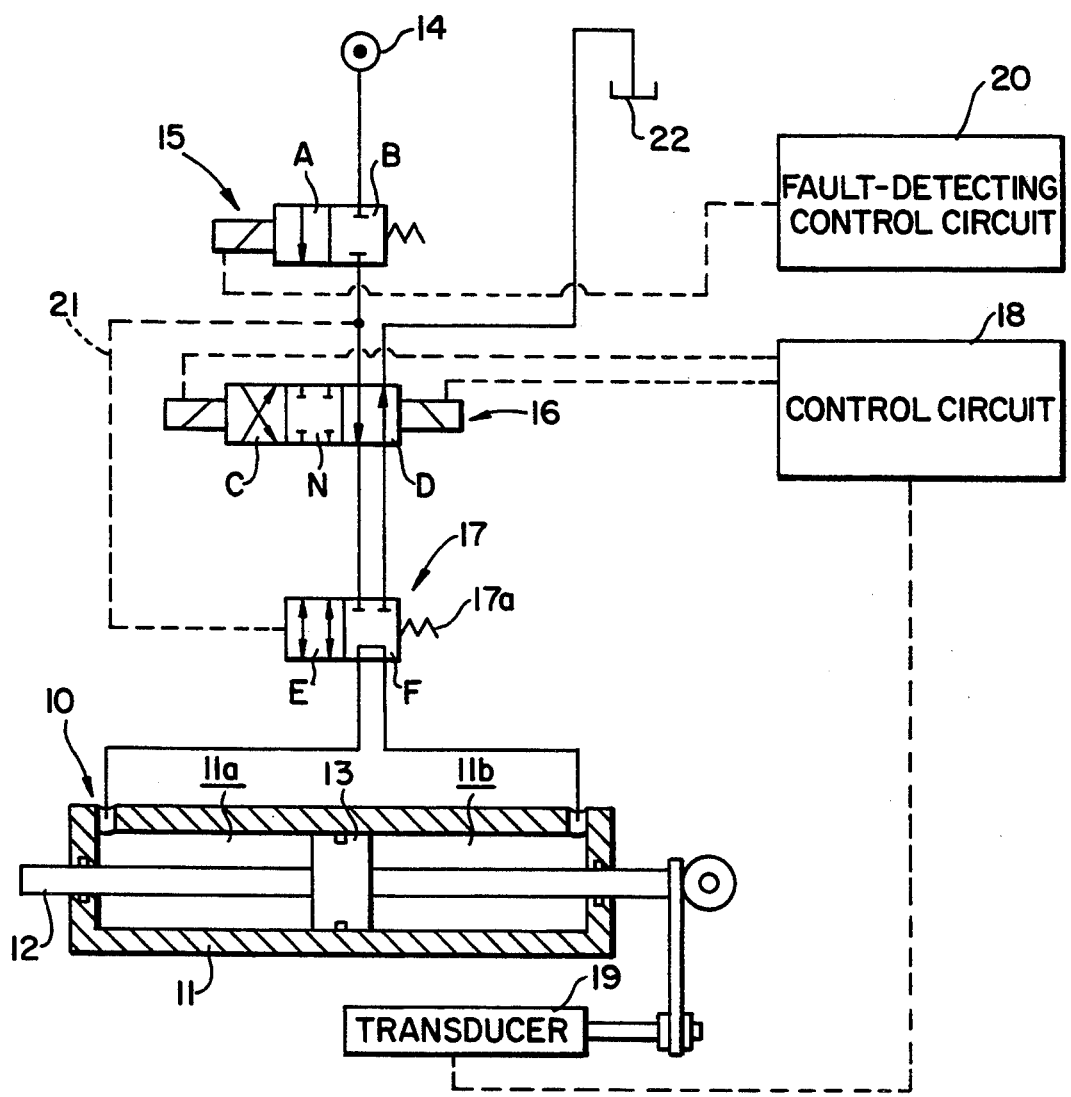
FIG. 9 is a schematic view showing another hydraulic circuit for use in the conventional control apparatus.

A plunger retaining assembly is generally indicated at 106 and comprises first and second plunger retaining members 106a and 106b received in the through bore 102 in the axial alignment with the through bore 102 and slidably movable along the center axis of the through bore 102. The first and second plunger retaining members 106a and 106b are coupled with each other to define a cylindrical axial complementary chamber 107 which is in axial alignment with the through bore 102. The first and second plunger retaining members 106a and 106b have respective axial bores 106aa and 106ba axially extending and held in fluid communication with the through bore 102 and the axial complementary chamber 107 of the plunger retaining members 106a and 106b. The first plunger retaining member 106a is formed with a radial fluid passageway 106ab held in communication with the axial complementary chamber 107 and the fluid port 41b2' of the fluid passageway 41b2 leading to the switching valve 48. 3 A valve seat member 108 is shown in FIGS. 2, 5 and 6 as having a large diameter portion 108a positioned in the axial complementary chamber 107 and formed with an annular spring seat ring portion 108b integrally formed with the large diameter portion 108a and also positioned in the axial complementary chamber 107, and a small diameter portion 108c slidably received in the axial bore 106ba of the second plunger retaining member 106b. The small diameter portion 108c of the valve seat member 108 is tapered at its axial outer end portion remote from the piston member 103 to have an annular pressure acting face 108ca which is to be applied with the hydraulic pressure of the working oil between the second plunger retaining member 106b and the plug member 113 in the second axial half bore portion 102b of the through bore 102. The valve seat member 108 is formed with an axial through bore 108d having a large diameter through bore portion 108da open to the axial complementary chamber 107, a small diameter through bore portion 108db open to the second half axial bore portion 102b of the through bore 102, and a plurality of radial bores 108e held in communication with the large diameter through bore portion 108da and the axial complementary chamber 107.

Figure 4:
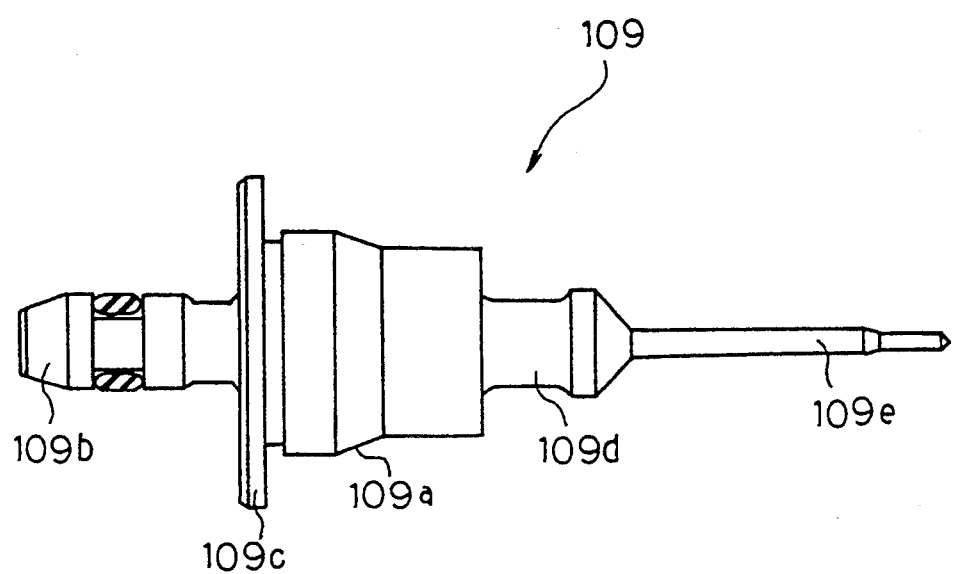
FIG. 4 is an enlarged plan view of a plunger member to be incorporated into the combination valve unit shown in FIG. 2.

A plunger member 109 is shown in FIGS. 2 and 4 as having a first cylindrical portion 109a positioned in the axial complementary chamber 107 of the first and second plunger retaining members 106a and 106b, a second cylindrical portion 109b extending away from the valve seat member 108 and throughout the axial bore 106aa of the first plunger retaining member 106a in engagement with the protrusion portion 103c of the piston member 103, a spring seat portion 109c integrally formed with the first and second cylindrical portions 109a and 109b and positioned in the axial complementary chamber 107 of the plunger retaining assembly 106, a third cylindrical portion 109d projecting from the first cylindrical portion 109a in a direction opposite with respect to the second cylindrical portion 109b and extending into the axial bore 108d of the valve seat member 108, a needle portion 109e projecting from the third cylindrical portion 109d in a direction opposite with respect to the first cylindrical portion 109a and extending into the small diameter through bore potion 108db of the valve seat member 108. The plunger member 109 and the valve seat member 108 are urged to axially move away from each other by suitable biasing means. In the embodiment herein shown in FIG. 2, such biasing means is assumed as comprising a preloaded helical compression spring 110 which is seated at one end thereof on the spring seat portion 109c of the plunger member 109 and at the other end thereof on the spring seat portion 108b of the valve seat member 108. The first and second plunger retaining members 106a and 106b are formed with annular grooves 106bb and 106bc, respectively, having seal rings 111 and 112 received therein.

A plug member 113 is securely coupled with the valve housing 101 to close the second axial half bore portion 102b of the through bore 102 and formed with an annular groove 113a having a seal ring 114 received therein. The plug member 113 has an axial groove 115 open to the second axial half bore portion 102b of the through bore 102 and a radial groove 116 held in fluid communication with the fluid port 41b1' of the fluid passageway 41b1 leading to the hydraulic chamber 42b of the actuator assembly 41. The axial groove 115 has a large diameter groove portion 115a and a small diameter portion 115b axially extending across a tapered portion 115c integrally formed with the large and small diameter portions 115a and 115b. The plug member 113 is formed with an annular spring seating ledge 115d between the small diameter portion 115b and the tapered portion 115c.

A popper valve 117 is shown in FIGS. 2 and 6 as having a large diameter portion 117a slidably received in the large diameter portion 115a of the axial groove 115 of the plug member 113 and held in engagement with the small diameter portion 108c of the valve seat member 108 projecting from the axial through bore 106ba of the second plunger retaining member 106b and the needle portion 109e of the plunger member 109 projectable from the small diameter through bore portion 108db of the valve seat member 108. The poppet valve 117 further has a small diameter portion 117b projecting from the large diameter portion 117a in a direction opposite with respect to the second plunger retaining member 106b across an intermediate axial portion 117c integrally formed with the large and small diameter portions 117a and 117b and slidably received in the small diameter portion 115b of the axial groove portion 115 of the plug member 113. The popper valve 117 is urged to axially move toward the second plunger retaining member 106b away from the plug member 113 by suitable biasing means. Such biasing means is assumed as comprising a preloaded helical compression spring 118 which is seated at one end thereof on the rear face of the large diameter portion 117a of the poppet member 117 and at the other end thereof on the annular spring seating ledge 115d of the plug member 113.

The biasing force of the helical compression spring 110 is designed to be adjusted manually by biasing force adjusting means 119, The biasing force adjusting means 119 is assumed as comprising a plug member 120 screwed to the valve housing 101 and formed with a bore 120a having a center axis perpendicular to the center axis of the through bore 102 and a cam member 121 having a rotatable axial portion 121a rotatably received in the bore 120a of the plug member 120 and having a cam portion 121b operatively coupled with the small diameter portion 103a of the piston member 103. The rotation of the cam member 121 causes the piston member 103 to axially move toward and away from the plunger retaining assembly 106 so that the helical compression spring 110 is adjusted to freely select the hydraulic pressure level of the hydraulic working oil at which the piston member 103 and the plunger retaining assembly 106 are axially moved, The rotatable axial portion 121a of the cam member 121 is formed with a hexagonal female tool groove 121aa engageable with a suitable male tool for rotation of the cam member 121 and an annular groove 121ab having a seal ring 122 received therein.

Under the state as shown in FIG. 2, the fluid passageways 41b1 and 41b2 are not held in communication with each other since the small diameter portion 108c of the valve seat member 108 is held in engagement with the large diameter portion 117a of the poppet valve 117 by means of the helical compression coil springs 110 and 118 while the hydraulic working oil is not supplied into the small and large diameter sections 102aa and 102ab of the first half axial bore portion 102a of the through bore 102 through the pilot fluid passageways 65 and 66 leading to the first and second electromagnetic valves 52 and 53 to act against the pressure acting faces 103aa and 103ba of the small and large diameter portions 103a and 103b of the piston member 103. Under the state that the hydraulic working oil is supplied into the small and large diameter sections 102aa and 102ab of the first half axial bore portion 102a of the through bore 102 to act against the pressure acting faces 103aa and 103ba of the small and large diameter portions 103a and 103b of the piston member 103 to have the hydraulic pressure raised to a predetermined level exceeding the biasing force of the helical cornpression helical springs 110 and 118, the piston member 103 and the plunger retaining assembly 106 are urged to axially move toward the plug member 113 against the helical compression coil springs 110 and 118, and the poppet valve 117 is thus urged simultaneously toward the plug member 113 away from the small diameter portion 108c of the valve seat member 108 against the helical compression spring 118 by the needle portion 109e of the plunger member 109 so that the annular gap is formed and held open between the small diameter portion 108c of the valve seat member 108 and the large diameter portion 117a of the poppet valve 117 to allow the hydraulic working oil to pass therethrough. It is thus to be understood that the hydraulic pressure of the working oil to be supplied into the small and large diameter sections 102aa and 102ab of the first half axial bore portion 102a of the through bore 102 causes the annular gap between the small diameter portion 108c of the valve seat member 108 and the large diameter portion 117a of the poppet valve 117 selectively to be opened and closed. It is also to be understood that the annular gap is caused to be opened and closed between the small diameter portion 108c of the valve seat member 108 and the large diameter portion 117a of the poppet valve 117 when any one of the small and large diameter sections 102aa and 102ab of the first half axial bore portion 102a of the through bore 102 is supplied with the hydraulic pressure of the working oil.

The above valve housing 101, the piston member 103, the first and second plunger retaining members 106a and 106b, the valve seat member 108, the plunger member 109, the helical compression spring 110, the plug member 113, the poppet valve 117, and the helical compression spring 118 define as a whole the check valve 63 which is already mentioned above along with FIG. 1.

The above valve housing 101, the piston member 103, the first and second plunger retaining members 106a and 106b, the valve seat member 108, the plunger member 109, the helical compression spring 110, the plug member 113, the poppet valve 117, and the helical compression spring 118 define as a whole the check valve 63 which is already mentioned above along with FIG. 1.

When, on the other hand, the hydraulic pressure of the working oil between the second plunger retaining member 106b and the plug member 113 in the second axial half bore portion 102b of the through bore 102 is raised to a predetermined level from the state as shown in FIG. 2, viz., the state that the fluid passageways 41b1 and 41b2 are not held in communication with each other and the small diameter portion 108c of the valve seat member 108 is held in engagement with the large diameter portion 117a of the popper valve 117 by means of the helical compression coil springs 110 and 118 while the hydraulic working oil is not supplied into the small and large diameter sections 102aa and 102ab of the first half axial bore portion 102a of the through bore 102 through the pilot fluid passageways 65 and 66 leading to the first and second electromagnetic valves 52 and 53 to act against the pressure acting faces 103aa and 103ba of the small and large diameter portions 103a and 103b of the piston member 103, the hydraulic pressure of the working oil is applied to the annular pressure acting face 108ca of the small diameter portion 108c of the valve seat member 108 to cause the valve seat member 108 to be urged to axially move against the helical compression coil spring 110 toward the piston member 103 away from the poppet valve 117. At this time, the plunger member 109 is held stationary as a result of the fact that the spring seat portion 109c of the plunger member 109 is held in engagement with the inner surface of the first plug retaining member 106a which is also maintained in position and the poppet valve 117 is prevented from moving toward the piston member 103 by the needle portion 109c of the stationary plug member 109 so that the annular gap is formed and held open between the small diameter portion 108c of the valve seat member 108 and the large diameter portion 117a of the poppet valve 117 to allow the hydraulic working oil to pass therethrough. The hydraulic working oil passing through the annular gap between the small diameter portion 108c of the valve seat member 108 and the large diameter portion 117a of the poppet valve 117 is fed to the second fluid pilot branch passageway 66 by way of the small and large diameter axial bore portions 108db and 108da of the valve seat member 108, the radial bore 108e of the valve seat member 108, the axial complementary chamber 107 of the first and second plunger retaining members 106a and 106b, the radial fluid passageway 106ab of the first plunger retaining member 106a, the fluid passageway 41b2, the check valve 58 and the first electromagnet valve 53. The hydraulic pressure of the hydraulic working oil supplied to the small diameter section 102aa of the first axial half bore portion 102a of the through bore 102 causes the piston member 103 to be urged to axially move toward the plug member 113 together with the plunger member 109 so that the annular gap is increased in width and held open between the small diameter portion 108c of the valve seat member 108 and the large diameter portion 117a of the popper valve 117 to allow the larger amount of the hydraulic working oil to pass therethrough in the similar manner which is already described in particular as above.

The above valve housing 101, the piston member 103, the first and second plunger retaining members 106a and 106b, the valve seat member 108 having a small diameter portion 108c with an annular tapered pressure acting face 108ca, the plunger member 109, the helical compression spring 110, the plug member 113, the poppet valve 117, and the helical compression spring 118 define as a whole the relief valve 64 which is already mentioned above along with FIG. 1.

When, now, the servomechanism 39 and the unillustrated servomechanism are in normal operation, the control signal is produced by the actuator control electrical circuit 49 to the control valve 47 on the basis of the control command of the pilot or the flight control computer of the aircraft and the detecting electrical signal from the transducer, so that the piston member 43 of the actuator assembly 41 is operated to control the control surface 45 of the aircraft. At the same time, the control surface 45 of the aircraft is controlled by the unillustrated servomechanism in a control way similar to that of the servomechanism 39. In the normal operation of the servomechanism 39, the first and second electromagnetic valves 52 and 53 are excited by the first and second damage detecting electrical circuits 56 and 59 and are shifted to assume the first electromagnetic valve positions P and R. This result in the fact that the hydraulic working oil is supplied from the hydraulic working oil source 46 to the first pilot port 48a of the switching valve 48 through the first electromagnetic valve 52 until the hydraulic working oil pressure is raised at the first pilot port 48a of the switching valve 48 to the predetermined first pilot pressure level, thereby causing the switching valve 48 to assume the first switching valve position L. The hydraulic working oil is supplied from the hydraulic working oil source 46 to one of the hydraulic chambers 42a and 42b of the actuator assembly 41 and from the other of the hydraulic chambers 42a and 42b to the hydraulic working oil reservoir 50 through the pair of fluid passageways 40a and 40b and the fluid feed and discharge passageways 71 and 60, so that the piston member 43 of the actuator assembly 41 is moved to drive the control surface 45 of the aircraft. When the hydraulic working oil is supplied from the hydraulic working oil source 46 to one of the hydraulic chambers 42a and 42b of the actuator assembly 41, the hydraulic working oil in one of the fluid passageways 40a and 40b is partially supplied through the first or second check valves 58 and 57 to the second electromagnetic valve held on the first electromagnetic valve position R, thereby causing the hydraulic working oil to be supplied from the second electromagnetic valve to the second pilot port 48b of the switching valve 48 and the second pilot port 63b of the third check valve 63 until the hydraulic working oil pressure is raised at the second pilot ports 48b and 63b to the predetermined second pilot pressure level.

The hydraulic working oil pressures at the first and second pilot ports 63a and 63b of the third check valve 63 are thus raised to the predetermined first and second pilot pressure levels, respectively, with the result that the third check valve 63 is shifted to assume the first valve position. Accordingly, the hydraulic working oil is caused to smoothly pass through the third check valve 63 in the normal operation of the servomechanism 39. If the air pressure received by the control surface 45 of the aircraft is increased to such an extent that the hydraulic working oil pressure in the fluid passageway 40a or 40b exceeds the predetermined pressure level, the hydraulic working oil is discharged from the fluid passageway 40a or 40b to the hydraulic working oil reservoir 50 through the safety valve 61.

If the servomechanism 39 happens to be damaged, the damage is detected by the damage detecting control electrical circuit and then the first electromagnetic valve is stopped from being excited. Consequently, the hydraulic working oil pressure at the first pilot port 48a of the switching valve 48 is reduced to the extent of a zero level, while the hydraulic working oil at the second pilot port 48b of the switching valve 48 is held to the predetermined second pilot pressure level, thereby causing the valve position of switching valve 48 to be switched from the first switching valve position L to the second switching valve position M. At this time, not only the hydraulic working oil is prevented from being supplied from and discharged from the control valve 47 to and from the switching valve 48 but also the fluid passageways 40a and 40b are held in communication with each other through the switching valve 48, so that the unillustrated servomechanism can control the control surface without the influence of the damaged servomechanism 39.

When the control valve 47 is held in a stationary sate by the unillustrated servomechanism, the hydraulic working oil is supplied from the fluid passageways 40a and 40b to the second pilot port 48b of the switching valve 48 as well as the second pilot port 48b of the third check valve 63 through the second electromagnetic valve 53. Consequently, the third check valve 63 is shifted to assume the second valve position in which the hydraulic working oil is permitted to be supplied from the switching valve 48 to the hydraulic camber 42b and interrupted from being supplied from the hydraulic chamber 42b to the switching valve 48, so that the control surface 45 is securely held in the stationary sate, thereby making it possible to enhance the control ability of the aircraft. As a result, it is unnecessary to excessively power up the engine of the aircraft so that the specific fuel consumption of the aircraft can be improved.

If the control surface 45 of the aircraft receives a large air pressure shown by a plurality of arrows in FIG. 1, the hydraulic working oil pressure at the hydraulic working chamber and in the fluid passage way 40b1 is increased with the result that the hydraulic working oil pressure is raised at the valve port 64a of the relief valve 64 to the predetermined pressure level.

At this time, the hydraulic working oil is supplied from the relief valve 64 to the second pilot port 63b of the third check valve 63 through the first check valve 58 and the second electromagnetic valve 53 until the hydraulic working oil pressure is raised at the second pilot port 63b of the third check valve 63 to the predetermined second pilot pressure level, thereby permitting the hydraulic working oil is supplied from the hydraulic working chamber 42b to the hydraulic working oil chamber 42 a through the third check valve 63 and the switching valve 48.

When the unillustrated servomechanism as well as the servomechanism 39 is damaged, the second damage detecting electrical circuit 59 stops the second electromagnetic valve from being excited. The hydraulic working off pressure at the second prior port 48b as well as at the first pilot port 48a is reduced to the extent of a zero level so that the valve position of the switching valve 48 is switched from the second switching valve position M to the third switching valve position O by the compression spring 51. The hydraulic working oil chambers of the actuator assembly 41 are held in fluid communication with each other through throttle member of the switching valve 48, thereby resulting in a damper effect which regulates the free motion of the control surface 45. Accordingly, the vibration of the control surface 45 is automatically prevented without a mass-balance weight or damper, and the fluttering phenomenon can be prevented. At this time, the hydraulic working oil is interrupted by the third check valve 63 from being supplied from the hydraulic chamber 42b to the switching valve 48. In this case, the hydraulic working oil in the hydraulic chamber 42b is permitted to be discharged to the hydraulic working oil reservoir 50 thorough the relief valve 64, the first check valve 58 and the safety valve 61 under the condition that the control surface 45 receive the large air pressure shown by the arrows in FIG. 1.

As will have been understood orm the foregoing description, the single switching valve 48 provided between the control valve 47 and the actuator assembly 41 is shiftable to assume the first to third switching valve positions L, M and O, i.e., the operation of the single switching valve 48 results in the fact that the servomechanism can make a selection from three fluid communication pattern between the control valve 47 and the actuator assembly 41. Therefore, the number of required hydraulic circuits such as valve units can be decreased, thereby making it possible to reduce the hydraulic working oil consumption to miniaturize and lighten the control apparatus for the control surface 45. This results in the lightened and low-priced aircraft. In addition, the valve position of the switching valve 48 is switched in response to the hydraulic working oil pressure at the first and second pilot ports 48a and 48b to which the hydraulic working oil is supplied from the first and second electromagnetic valves 52 and 53 of the same type. Consequently, the switching valve 48 is operated by a little hydraulic working oil and the control apparatus for the control surface 45 can be simply constructed, miniaturized, lightened and low-priced. If the hydraulic working oil pressure in the fluid leak passageway 77 between the first and second check valves 58 and 57 and the second electromagnetic valve is excessively increased in response to a rise in temperature, the hydraulic working oil pressure is reduced by the safety valve 61. Accordingly, it is unnecessary to define the leak passageway 77 by a high pressure tight member and to provide a pair of safety valves on the pair of fluid passageways 40a and 40b, respectively so that the control apparatus can be lightened and low-priced. If the hydraulic working oil pressure of the hydraulic working oil source 46 is under the first and second predetermined pilot pressure levels, the switching valve is shifted to assume the third switching valve position O, thereby causing the hydraulic working oil chambers 42a and 42b to be held in communication with each other through the throttle member 48c the switching valve 48. Therefore, it is possible to reduce the hydraulic working oil consumption. The combination valve unit 62 provided on the fluid passageway 40b is constituted by not a valve unit including a multi-land-type spool but the third check valve 63 and the relief valve 64, so that the combination valve unit 62 can certainly prevent the hydraulic working oil from being leaked out in comparison with the valve unit provided with the multi-land-type spool. In this embodiment, the switching valve 48 is designed to assume the valve position selected in response to the pilot pressures at the pilot ports 48a and 48b thereof, however, the switching valve 48 may be constituted by an electromagnetic valve which is electrically connected to the control signal producing means so as to cause the switching valve 48 to assume the second and third switching valve positions in response to the first and second control signals from the control signal producing means, respectively.

It will be understood by those skilled in the art that the foregoing description is in terms of preferred embodiment of the present invention wherein various changes and modification may be made without departing from the spirit and scope of the invention, as set forth in the appended claims.

What is claimed is:

1. A control apparatus comprising a plurality of servomechanisms for controlling the Control surface of an aircraft and control signal producing means for producing first and second control signals to said servomechanisms, the first control signal of said control signal producing means being produced to at least one of said servomechanisms which happens to be damaged, and said second control signal of said control signal producing means being produced to all of said servomechanisms which happen to be damaged, each of said servomechanisms comprising:

a hydraulic working oil source for supplying hydraulic working oil under pressure;

a hydraulic working oil reservoir for reserving said hydraulic working oil;

an actuator assembly for driving said control surface of said aircraft, said actuator assembly having a cylinder member and a piston member slidably received in said cylinder member, said cylinder member and said piston member collectively defining a pair of hydraulic chambers, said piston member being operatively connected to said control surface of said aircraft;

a control valve held in fluid communication with said hydraulic chambers of said actuator assembly through a pair of fluid passageways, with said hydraulic working oil source and with said hydraulic working oil reservoir, said control valve being operative to assume a first control valve position in which said hydraulic working oil is supplied from said hydraulic working oil source to one of said hydraulic chambers through said control valve and discharged from the other of said hydraulic chambers to said hydraulic working oil reservoir through said control valve to force said piston member of said actuator assembly to be moved in a first driving direction, a second control valve position in which said hydraulic working oil is supplied from said hydraulic working oil source to said other of said hydraulic chambers through said control valve and discharged from said one of said hydraulic chambers to said hydraulic working oil reservoir through said control valve to force said piston member of said actuator assembly to be moved in a second driving direction, and a third control valve position in which said hydraulic working oil is interrupted from being supplied from said hydraulic working oil source to said hydraulic chambers of said actuator assembly and discharged from said hydraulic chambers of said actuator assembly to said hydraulic working reservoir through said control valve to prevent said piston member of said actuator assembly from being moved;

a switching valve provided on said pair of fluid passageways between said actuator assembly and said control valve to be held in fluid communication with said hydraulic chambers of said actuator assembly and said control valve and having a throttle valve member, said switching valve being operative to assume a first switching valve position in which said hydraulic working oil is permitted to be supplied from said hydraulic working oil source alternatively to one and the other of said hydraulic chambers and discharged alternatively from one of the other said hydraulic chambers of said actuator assembly to said hydraulic working oil reservoir to move said piston member of said actuator assembly alternatively in said first and second directions in the state of the first and second control valve positions of said control valve, a second switching valve position in which said hydraulic working oil is interrupted from being supplied from said hydraulic working oil source to said hydraulic chambers of said actuator assembly and from being discharged from said hydraulic chambers of said actuator assembly to said hydraulic working oil reservoir to cause said hydraulic chambers of said actuator assembly to be held in fluid communication with each other through said pair of fluid passageways, and a third switching valve position in which said hydraulic working oil is interrupted from being supplied from said hydraulic working oil source to said hydraulic chambers of said actuator assembly and from being discharged from said hydraulic chambers of said actuator assembly to said hydraulic working oil reservoir to cause said hydraulic chambers of said actuator assembly to be held in fluid communication with each other through said throttle valve member and said pair of fluid passageways;

first change-over means for causing said switching valve to assume said second switching valve position in response to said first control signal from said control signal producing means; and second change-over means for causing said switching valve to assume said third switching valve position in response to said second control signal from said control signal producing means.

2. A control apparatus as set forth in claim 1, in which each of said servomechanisms further comprising:

a first check valve held in fluid communication with one of said hydraulic chambers of said actuator assembly and said switching valve through one of said pair of fluid passageways and with said second change-over means in a manner permitting said hydraulic working oil to be supplied from said one of said hydraulic cambers of said actuator assembly to said second change-over means and interrupting said hydraulic working oil from being supplied from said second change-over means to said one of said hydraulic chambers of said actuator assembly, and a second check valve held in fluid communication with the other of hydraulic chambers of said actuator assembly and said switching valve through the other of said pair of fluid passageways and with said second change-over means and the other of said hydraulic chambers of said actuator assembly in a manner permitting said hydraulic working oil to be supplied only from the other of said hydraulic chambers of said actuator assembly to said second changeover means and interrupting said hydraulic working oil from being supplied from said second change-over means to the other of said hydraulic chambers of said actuator assembly;

wherein said switching valve includes first and second pilot ports, said switching valve assuming the first switching valve position at least when the hydraulic working oil pressure at the first pilot port of said switching valve is raised to a predetermined first pilot pressure level, said switching valve assuming the second switching valve position when the hydraulic working oil pressure at the second pilot port of said switching valve is raised to a predetermined second pilot pressure level, and said switching valve assuming the third switching valve position when the hydraulic working oil pressures at the first and second pilot ports are less than said predetermined first and second pilot pressure level, respectively; and wherein said first change-over means includes an electromagnetic valve held in fluid communication with the first pilot port of said switching valve through a first fluid pilot passageway, with said hydraulic working oil source and with said hydraulic working oil reservoir, the electromagnetic valve of said first changeover means being operative to assume a first electromagnetic valve position in which said hydraulic working oil is permitted to be supplied from said hydraulic working oil source to the first pilot port of said switching valve through the electromagnetic valve of said first change-over means until the hydraulic working oil pressure is raised at the first pilot port of said switching valve to said predetermined first pilot pressure level and second electromagnetic valve position in which said hydraulic working oil is discharged from said first pilot port of said switching valve to said hydraulic working oil reservoir through the electromagnetic valve of said first change-over means, the electromagnetic valve of said first change-over means assuming the second electromagnetic valve position in response to said first control signal of said control signal producing means, said second change-over means including an electromagnetic valve held in fluid communication with the second pilot port of said switching valve through a second fluid pilot passageway, with first and second check valves through a fluid leak passageway and with said hydraulic working oil reservoir, the electromagnetic valve of said second change-over means being operative to assume a first electromagnetic valve position in which said hydraulic working oil is permitted to be supplied from said hydraulic chambers of actuator assembly to the second pilot port of said switching valve through said first and second check valves and the electromagnetic valve of said second change-over means until the working oil pressure is raised at the second pilot port of said switching valve to said predetermined second pilot pressure level and a second electromagnetic valve position in which said hydraulic working oil is discharged from the second pilot port of said switching valve to said hydraulic working oil reservoir through the electromagnetic valve of said second change-over means, and the electromagnetic valve of said second change-over means assuming the second electromagnetic valve position in response to said second control signal from said control signal producing means.

3. A control apparatus as set forth in claim 2, in which each of said servomechanisms further comprises:

a third check valve provided on said one of said pair of said fluid passageways to be held in fluid communication with said switching valve and said one of said hydraulic chambers of said actuator assembly and having first and second pilot ports, said third check valve being operative to assume a first valve position in which said hydraulic working oil is permitted to be supplied from said switching valve to said one of said hydraulic chambers of said actuator assembly through said third check valve and interrupted from being supplied from said one of said hydraulic chambers of said actuator assembly to said switching valve through said third check valve and a second valve position in which said hydraulic working oil is permitted to be supplied alternatively from said switching valve to said one of said hydraulic chambers of said actuator assembly and from said one of said hydraulic chambers of said actuator assembly to said switching valve through said third check valve, the first pilot port of said third check valve being held in fluid communication with said first fluid pilot passageway between the electromagnetic valve of said first change-over means and the first pilot port of said switching valve so that the hydraulic working oil pressure at the first pilot port of said third check valve is caused to be equal to the hydraulic working oil pressure at the first pilot port of said switching valve, the second pilot port of said third check valve being held in fluid communication with said second fluid pilot passageway between the electromagnetic valve of said second change-over means and the second pilot port of said switching valve so that the hydraulic working oil pressure at the second pilot port of said third check valve is caused to be equal to the hydraulic working oil pressure at the second pilot port of said switching valve, and said third check valve assuming the second valve position when the hydraulic working oil pressure is raised at the first pilot port of said third check valve to said predetermined first pilot pressure level and when the hydraulic working oil pressure is raised at the second pilot port of said third check valve to said predetermined second pilot pressure level;

a relief valve held in fluid communication with said one of said hydraulic chambers of said actuator assembly and said switching valve through a by-pass passageway bypassing said third check valve, said relief valve having a relief valve port held in fluid communication with the bypass passageway between said relief valve and said actuator assembly to permit said hydraulic working oil passing through said bypass passageway to be supplied from said one of said hydraulic chambers of said actuator assembly to said switching valve through said relief valve when the hydraulic working oil pressure is raised in the bypass passageway between said relief valve and said actuator assembly to a predetermined pressure level.

4. A control apparatus as set forth in claim 2, in which each of said servomechanisms further comprises a safety valve held in fluid communication with said fluid leak passageway between said first and second check valves and the electromagnetic valve of said second change-over means and with said hydraulic working oil reservoir, said safety valve having a safety valve port held in fluid communication with said fluid leak passageway to permit said hydraulic working oil to be supplied from said first and second check valves to said hydraulic working oil reservoir when the hydraulic working oil pressure is raised in said fluid leak passageway to a predetermined pressure level.

5. A control apparatus as set forth in claim 4, in which each of said servomechanisms further comprises:

a third check valve provided on said one of said pair of said fluid passageways to be held in fluid communication with said switching valve and said one of said hydraulic chambers of said actuator assembly and having first and second pilot ports, said third check valve being operative to assume a first valve position in which said hydraulic working oil is permitted to be supplied from said switching valve to said one of said hydraulic chambers of said actuator assembly through said third check valve and interrupted from being supplied from said one of said hydraulic chambers of said actuator assembly to said switching valve through said third check valve and a second valve position in which said hydraulic working oil is permitted to be supplied alternatively from said switching valve to said one of said hydraulic chambers of said actuator assembly and from said one of said hydraulic chambers of said actuator assembly to said switching valve through said third check valve, the first pilot port of said third check valve being held in fluid communication with said first fluid pilot passageway between the electromagnetic valve of said first change-over means and the first pilot port of said switching valve so that the hydraulic working oil pressure at the first pilot port of said third check valve is caused to be equal to the hydraulic working oil pressure at the first pilot port of said switching valve, the second pilot port of said third check valve being held in fluid communication with said second fluid pilot passageway between the electromagnetic valve of said second change-over means and the second pilot port of said switching valve so that the hydraulic working oil pressure at the second pilot port of said third check valve is caused to be equal to the hydraulic working oil pressure at the second pilot port of said switching valve, and said third check valve assuming the second valve position when the hydraulic working oil pressure is raised at the first pilot port of said third check valve to said predetermined first pilot pressure level and when the hydraulic working oil pressure is raised at the second pilot port of said third check valve to said predetermined second pilot pressure level;

a relief valve held in fluid communication with said one of said hydraulic chambers of said actuator assembly and said switching valve through a by-pass passageway bypassing said third check valve, said relief valve having a relief valve port held in fluid communication with the bypass passageway between said relief valve and said actuator assembly to permit said hydraulic working oil passing through said bypass passageway to be supplied from said one of said hydraulic chambers of said actuator assembly to said switching valve through said relief valve when the hydraulic working oil pressure is raised in the bypass passageway between said relief valve and said actuator assembly to a predetermined pressure level.

6. A control apparatus as set forth in claim 1, in which said switching valve comprises an electromagnetic valve electrically connected to said control signal producing means so as to cause said switching valve to assume said second and third switching valve positions in response to said first and second control signals from said control signal producing means, respectively.

7. A control apparatus, comprising a plurality of servomechanisms for controlling the control surface of an aircraft, each of said servomechanisms comprising:

a hydraulic working oil source for supplying working oil under pressure;

a hydraulic working oil reservoir for reserving said hydraulic working oil;

an actuator assembly for driving said control surface of said aircraft, said actuator assembly having a cylinder member, and a piston member slidably received in said cylinder member, said cylinder member and said piston member collectively defining a pair of hydraulic chambers, said piston member being operably connected to said control surface of said aircraft;

a control valve held in fluid communication with said hydraulic chambers of said actuator assembly through a pair of fluid passageways, with said hydraulic working oil source and with said hydraulic working oil reservoir, said control valve being operative to assume a first control valve position in which said hydraulic working oil is supplied from said hydraulic working oil source to one of said hydraulic chambers through said control valve and discharged from the other of said hydraulic chambers to said hydraulic working oil reservoir through said control valve to force said piston member of said actuator assembly to be moved in a first driving direction, a second control valve position in which said hydraulic working oil is supplied from said hydraulic working oil source to said other of said hydraulic chambers through said control valve and discharged from said one of said hydraulic chambers to said hydraulic working oil reservoir through said control valve to force said piston member of said actuator assembly to be moved in a second driving direction, and a third control valve position in which said hydraulic working oil is interrupted from being supplied from said hydraulic working oil source to said hydraulic chambers of said actuator assembly and discharged from said hydraulic chambers of said actuator assembly to said hydraulic working reservoir through said control valve to prevent said piston member of said actuator assembly from being moved;

a check valve provided on one of said pair of said fluid passageways to be held in fluid communication with said control valve and one of said hydraulic chambers of said actuator assembly and having at least a pilot port, said check valve being operative to assume a first check valve position in which said hydraulic working oil is permitted to be supplied from said control valve to said one of said hydraulic chambers of said actuator assembly through said check valve and interrupted from being supplied from said one of said hydraulic chambers of said actuator assembly to said control valve through said check valve and a second check valve position in which said hydraulic working oil is permitted to be supplied alternatively from said control valve to said one of said hydraulic chambers of said actuator assembly and from said one of said hydraulic chambers of said actuator assembly to said control valve through said check valve, and said check valve assuming second check valve position under the condition that the hydraulic working pressure is raised at said pilot port of said check valve to said predetermined pressure level;

a relief valve held in fluid communication with said one of said hydraulic chambers of said actuator assembly and said control valve through a bypass passageway bypassing said check valve, said relief valve having a relief valve port held in fluid communication with the bypass passageway between said relief valve and said actuator assembly to permit said hydraulic working oil passing through said bypass passageway to be supplied from said one of said hydraulic chambers of said actuator assembly to said control valve through said relief valve when the hydraulic working oil pressure is raised in the bypass passageway between said relief valve and said actuator assembly to a predetermined pressure level; and pilot pressure control means held in fluid communication with the pilot port of said check valve through a fluid pilot passageway to supply said hydraulic working oil to the pilot port of said check valve until the hydraulic working pressure is raised at the pilot port of said check valve to said predetermined pressure level when said control valve assumes said first and second control valve positions and when said relief valve permits said hydraulic working oil passing through said bypass passageway to be supplied from said one of said hydraulic chambers of said actuator assembly to said control valve through said relief valve.

8. A control apparatus as set forth in claim 7, further comprising control signal producing means for producing a control signal under the condition that at least one of said servomechanisms happens to be damaged, wherein each of said servomechanisms further comprises a switching valve provided on said pair of fluid passageways between said check valve and said control valve to be held in fluid communication with said hydraulic chambers of said actuator assembly and said control valve and having a throttle valve member and a pilot port which is held in fluid communication with the pilot port of said check valve, said switching valve being operative to assume a first switching valve position in which said hydraulic working oil is permitted to be supplied from said hydraulic working oil source alternatively to one and the other of said hydraulic chambers and discharged alternatively from one and the other of said hydraulic chambers of said actuator assembly to said hydraulic working oil reservoir to move said piston member of said actuator assembly alternatively in said first and second directions in the state of the first and second control valve positions of said control valve, a second switching valve position in which said hydraulic working oil is interrupted from being supplied from said hydraulic working oil source to said hydraulic chambers of said actuator assembly and from being discharged from said hydraulic chambers of said actuator assembly to said hydraulic working oil reservoir to cause said hydraulic chambers of said actuator assembly to be held in fluid communication with each other through said pair of fluid passageways, and a third switching valve position in which said hydraulic working oil is interrupted from being supplied from said hydraulic working oil source to said hydraulic chambers of said actuator assembly and from being discharged from said hydraulic chambers of said actuator assembly to said hydraulic working oil reservoir to cause said hydraulic chambers of said actuator assembly to be held in fluid communication with each other through said throttle valve member and said pair of fluid passageways, and the switching valve selecting and assuming one of said first to third switching valve positions in response to the hydraulic working oil pressure at the pilot port of said switching valve, wherein said pilot pressure control means supplying said hydraulic working oil to the pilot port of said switching valve and the pilot port of said check valve until the hydraulic working oil pressure is raised at both the pilot ports of said switching valve and said check valve to said predetermined pressure level.

9. A control apparatus as set forth in claim 7, in which said check valve and said relief valve collectively form a combination valve unit to be handled in a single unit.

10. A control apparatus as set forth in claim 9, in which said combination valve unit comprising:

a valve housing having a through bore formed therein and having a center axis;

a pilot piston member axially movably received in said through bore and having at least a pressure acting face receiving hydraulic pressures of hydraulic working oil supplied from said pilot pressure control means;

a plunger retaining assembly comprising first and second plunger retaining members received in said through bore in said axial alignment with said through bore and slidably movable along the center axis of said through bore, said first and second plunger retaining members being coupled with each other to define a cylindrical axial complementary chamber which is in axial alignment with said through bore, said first and second plunger retaining members having respective axial bores axially extending and held in fluid communication with said through bore and said axial complementary chamber of said plunger retaining members, said first plunger retaining member being formed with a radial fluid passageway held in communication with said axial complementary chamber and said fluid passageway leading to said control valve;

a valve seat member having a large diameter portion positioned in said axial complementary chamber and formed with a annular spring seat ring portion integrally formed with said large diameter portion and also positioned in said axial complementary chamber, and a small diameter portion slidably received in said axial bore of said second plunger retaining member, said valve seat member being formed with an axial through bore having a large diameter axial through bore portion open to said axial complementary chamber, a small diameter axial through bore portion open to said through bore, and a plurality of radial bores held in communication with said large diameter axial through bore portion and said axial complementary chamber;

a plunger member has a first cylindrical portion positioned in said axial complementary chamber of said first and second plunger retaining members, a second cylindrical portion extending away from said valve seat member and throughout said axial bore of said first plunger retaining member in engagement with said pilot piston member, a spring seat portion integrally formed between said first and second cylindrical portions and positioned in said axial complementary chamber of said plunger retaining member, a third cylindrical portion projecting from said first cylindrical portion in a direction opposite with respect to said second cylindrical portion and extending into said axial bore of said valve seat member, a needle portion projecting from said third cylindrical portion in a direction opposite with respect to said first cylindrical portion and extending into said axial bore of said valve seat member, said plunger member and said valve seat member being urged to axially move away from each other by biasing means;

a plug member coupled with said valve housing to close said through bore, said plug member having an axial groove open to said through bore and a radial groove held in fluid communication with said fluid passageway leading to said one of said hydraulic chambers of said actuator assembly, said axial groove has a large diameter groove portion and a small diameter portion axially extending across a tapered intermediate portion integrally formed with said large and small diameter portions; said plug member being formed with an annular spring seating ledge between said small diameter intermediate portion and said tapered portion; and a popper valve having a large diameter portion slidably received in said large diameter portion of said axial groove of said plug member and held in engagement with said small diameter portion of said valve seat member projecting from said axial bore of said second plunger retaining member and said needle portion of said plunger member also projecting from said axial bore of said valve seat member, said poppet valve further having a small diameter portion projecting from said large diameter portion in a direction opposite with respect to said second plunger retaining member across an intermediate axial portion integrally formed with said large and small diameter portions and slidably received in said small diameter portion of said axial groove portion of said plug member, said popper valve being urged to axially move toward said second plunger retaining member away from said plug member by biasing means;

said above valve housing, said pilot piston member, said first and second plunger retaining members, said valve seat member, said plunger member, said helical compression spring, said plunger member, said poppet valve, and said helical compression spring defining as a whole said check valve;

said above valve housing, said pilot piston member, said first and second plunger retaining members, said valve seat member having a small diameter portion with an annular tapered pressure acting face, said plunger member, said helical compression spring, said plunger member, said poppet valve, and said helical compression spring defining as a whole said relief valve.

11. A control apparatus as set forth in claim 10, in which said biasing means comprises a preloaded helical compression spring seated at one end thereof on said spring seat portion of said plunger member and at said other end thereof on said spring seat portion of said valve seat member.

12. A control apparatus as set forth in claim 10, in which said biasing means comprises a preloaded helical compression spring seated at one end thereof on the rear face of said large diameter portion of said poppet valve and at the other end thereof on said annular spring seating ledge of said plug member.

13. A control apparatus as set forth in claim 11, in which the biasing force of said helical compression spring is adjusted manually by biasing force adjusting means.

14. A control apparatus as set forth in claim 13, in which said biasing force adjusting means comprises a adjustable plug member screwed to said valve housing and formed with a bore having a center axis perpendicular to said center axis of said through bore and a cam member having a rotatable axial portion rotatably received in said bore of said plug member and having a cam portion operatively coupled with said pilot piston member, said rotation of said cam member causing said pilot piston member to axially move toward and away from said plunger retaining member so that said helical compression spring between said plunger member and said valve seat member is adjusted to freely select the hydraulic pressure level of said hydraulic working oil at which said pilot piston member and said plunger member are axially moved.

* * * * *